(12) United States Patent
McEvilly et al.

(10) Patent No.: US 7,624,412 B2
(45) Date of Patent: Nov. 24, 2009

(54) RECORDING AND PLAYBACK SYSTEM

(75) Inventors: Chris McEvilly, Surrey (GB);
Shaheedur Reza Haque, London (GB)

(73) Assignee: Alcatel, Paris (FR)

( * ) Notice: Subject to any disclaimer, the term of this patent is extended or adjusted under 35 U.S.C. 154(b) by 615 days.

(21) Appl. No.: 10/516,470

(22) PCT Filed: Jun. 20, 2003

(86) PCT No.: PCT/GB03/02708

§ 371 (c)(1),
(2), (4) Date: Jan. 28, 2005

(87) PCT Pub. No.: WO04/002156

PCT Pub. Date: Dec. 31, 2003

(65) Prior Publication Data

US 2005/0275758 A1    Dec. 15, 2005

(30) Foreign Application Priority Data

Jun. 21, 2002    (GB) ................................ 0214444.2

(51) Int. Cl.
G06F 3/00        (2006.01)
H04N 5/445       (2006.01)
G06F 13/00       (2006.01)
H04N 5/91        (2006.01)

(52) U.S. Cl. ............................ 725/46; 725/39; 725/44; 725/59; 725/93; 725/116; 386/83

(58) Field of Classification Search .................... 725/39, 725/44, 46, 59, 93; 386/83
See application file for complete search history.

(56) References Cited

U.S. PATENT DOCUMENTS

| | | | | |
|---|---|---|---|---|
| 5,619,247 A * | 4/1997 | Russo | ......................... | 725/104 |
| 6,539,548 B1 * | 3/2003 | Hendricks et al. | ............ | 725/109 |
| 6,611,654 B1 * | 8/2003 | Shteyn | ......................... | 386/83 |
| 6,760,918 B2 * | 7/2004 | Rodriguez et al. | ........... | 725/134 |
| 6,789,106 B2 * | 9/2004 | Eyer et al. | ................... | 709/205 |
| 6,834,156 B1 * | 12/2004 | Marko et al. | .................. | 386/94 |
| 7,320,137 B1 * | 1/2008 | Novak et al. | ................. | 725/134 |
| 2002/0154892 A1 * | 10/2002 | Hoshen et al. | ................. | 386/87 |

FOREIGN PATENT DOCUMENTS

| | | |
|---|---|---|
| WO | WO 91/03112 | 3/1991 |
| WO | WO 9103112 A1 * | 3/1991 |
| WO | WO 97/48230 | 12/1997 |
| WO | WO 01/56285 A1 | 8/2001 |
| WO | WO 01/74076 A1 | 10/2001 |
| WO | WO 02/23909 A1 | 3/2002 |

* cited by examiner

*Primary Examiner*—Brian T Pendleton
*Assistant Examiner*—Pinkal R Chokshi
(74) *Attorney, Agent, or Firm*—Sughrue Mion, PLLC

(57) ABSTRACT

An interactive television system is provided which provides personal video recorder services for users. In the embodiment described, content is recorded at a head-end of the system and stored in the user's set top boy for future playout. Access to the content stored in the user's top box is also controlled by the head end.

43 Claims, 13 Drawing Sheets

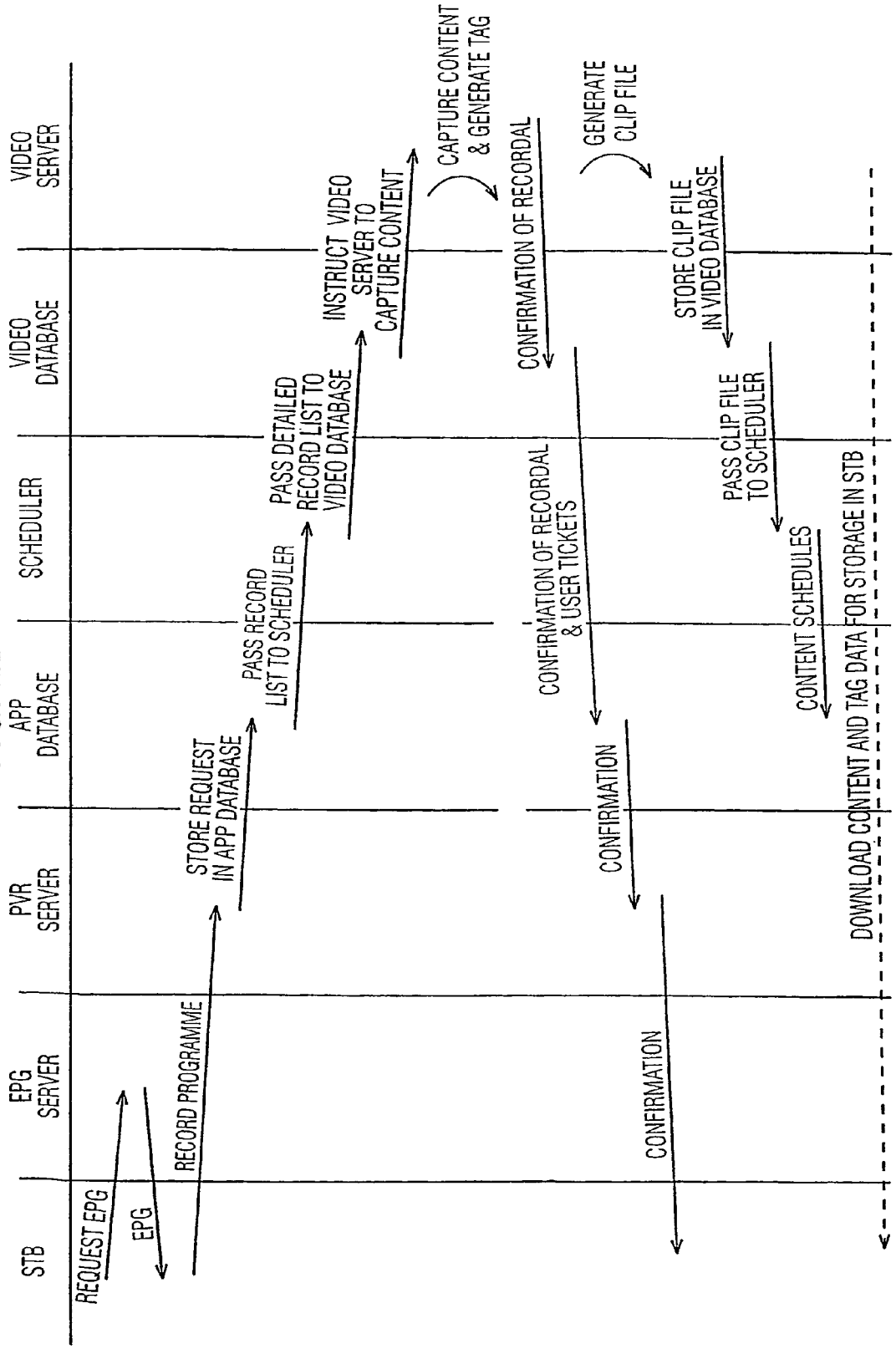

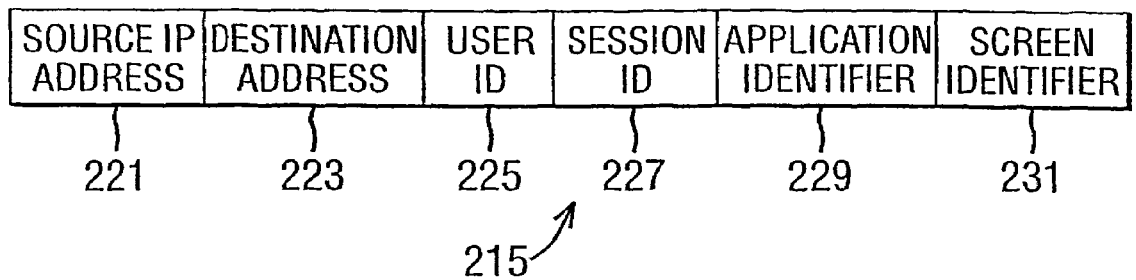
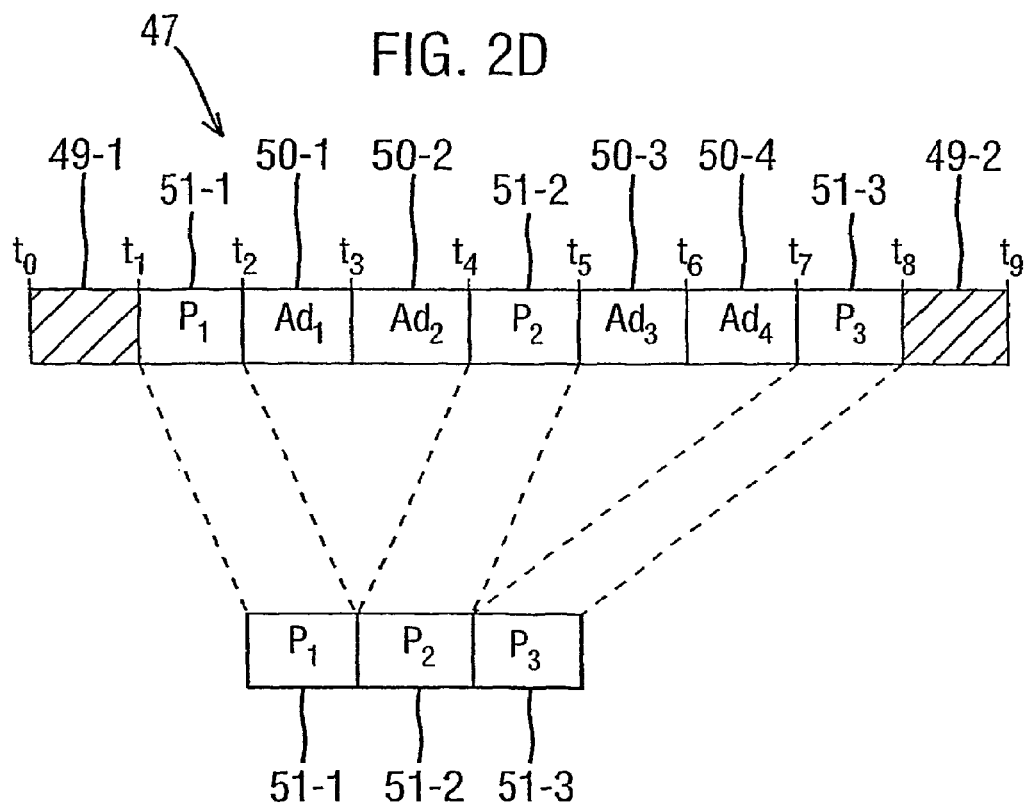

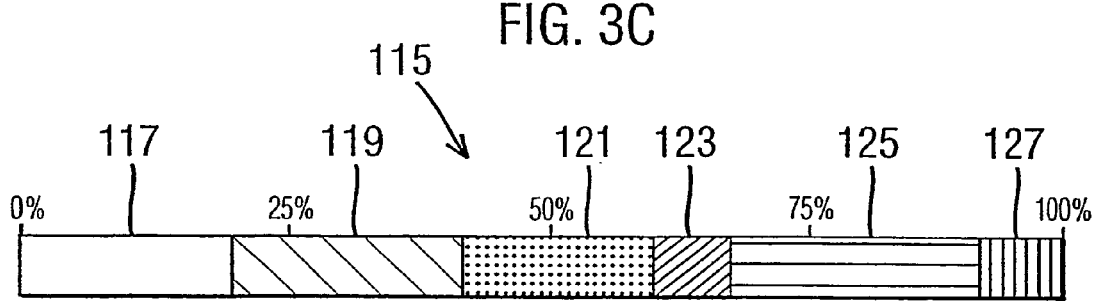

RECORDING AND PLAYBACK SYSTEM

The present invention relates to an interactive content delivery system. The invention has particular although not exclusive relevance to an interactive television system having personal video recorder functionality.

Conventionally, television programmes have been broadcast to users via RF signals transmitted from terrestrial base stations, via signals transmitted from overhead satellites and via signals transmitted over cable to user premises. Each of these systems offers the user the ability to watch a number of different channels which can be selected by the user. These existing systems, however, require all of the channels to be transmitted to the user's television receiver, which then tunes into and displays one of the channels in accordance with the user's selection. In some of these conventional systems, the user must subscribe to the service provider in order to be able to view some of the channels. However, since each user's television receiver receives all of the channels, users can still gain access to restricted channels using appropriate hacking equipment which can bypass the service provider's security.

Further, with these conventional systems, the television viewing experience for the user is one in which the user is effectively passive. In other words, the programme schedule, is fixed in advance by the service providers and the only choice that the user has is which channel he wishes to view. New interactive television systems are beginning to emerge in which the user can interact through the television with the service providers to control the content that is delivered, thereby creating a more personal entertainment experience. These systems employ menu-based user interface systems to allow the user access to the various services that are available. However, to date, these menu-based interfaces are difficult and confusing for the user to operate. Further, current menu interface systems are designed as "one size fits all" systems, typically transmitting to and displaying for every user of the system in a particular region the same channel line-up (usually in numerical order) and programming information in the same format and style.

In order to provide users having conventional television sets with the ability to be able to interact with the service providers, a user set top box (STB) is provided. At present, various service providers have produced their own set top box, each having different hardware and software loaded thereon. The service providers have focused on adding significant processing power to the set top box and download proprietary software for maintaining, processing and displaying the bulk of the control data such as, for example, user profile data, programme guide data and usage data. As a result of the complexity of these proprietary set top boxes, the overhead associated with deploying, maintaining, upgrading, monitoring and using the system requires significant user support. In particular, each time a change is made to such systems, each user's set top box needs to be checked and upgraded or even replaced. Further, with this type of system the development of new applications is more difficult and time consuming, since each application must be written in a format that suits the processor speed, operating system and internal architecture of each set top box.

Additionally, some of these set top boxes include a hard disc for recording programmes or videos for subsequent playout. These recording systems also require additional software control for controlling the storage and retrieval of the files to and from the hard disc. However, since the software for controlling access to the video files stored in the hard disc is provided locally within the set top box, it is difficult to implement any parental control for different users of the same set top box.

Another proposal for providing personal video recording capabilities is to provide storage remotely within a video server which is coupled to the set top box through a data network. With this system, however, users in the same geographical area are likely to want to access content stored within the remote video server at similar times, thereby leading to significant increases in the amount of traffic in the data network at some times of the day.

According to one aspect, the present invention provides an alternative interactive television system having personal video recorder capabilities in which local storage is provided within a user's set top box but in which the access to the content stored in the user's set top box is controlled by a remote server coupled to the set top box.

Other aspects and features of the present invention will become apparent from the following detailed description of preferred embodiments which is given with reference to the accompanying drawings in which:

FIG. 2b is a timing diagram illustrating the communications that are made between the components shown in FIG. 2a during this recording operation;

FIG. 2c is a schematic diagram illustrating the components of a user request that is generated by the user's set top box in response to an input by the user;

Figure 1:
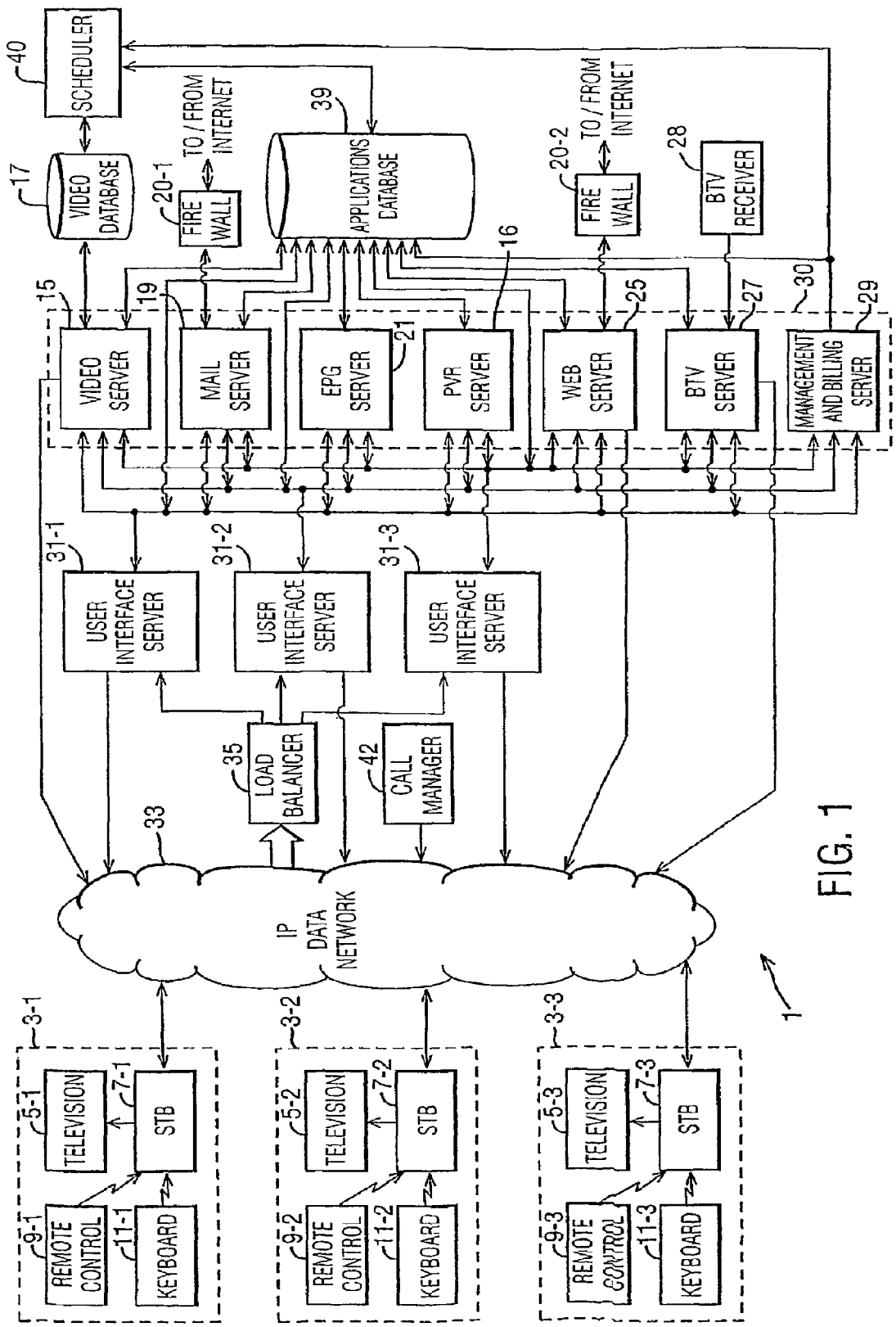
FIG. 1 is a schematic block diagram of the architecture of a system for providing a user with access to a plurality of services and content.
Figure 3A:
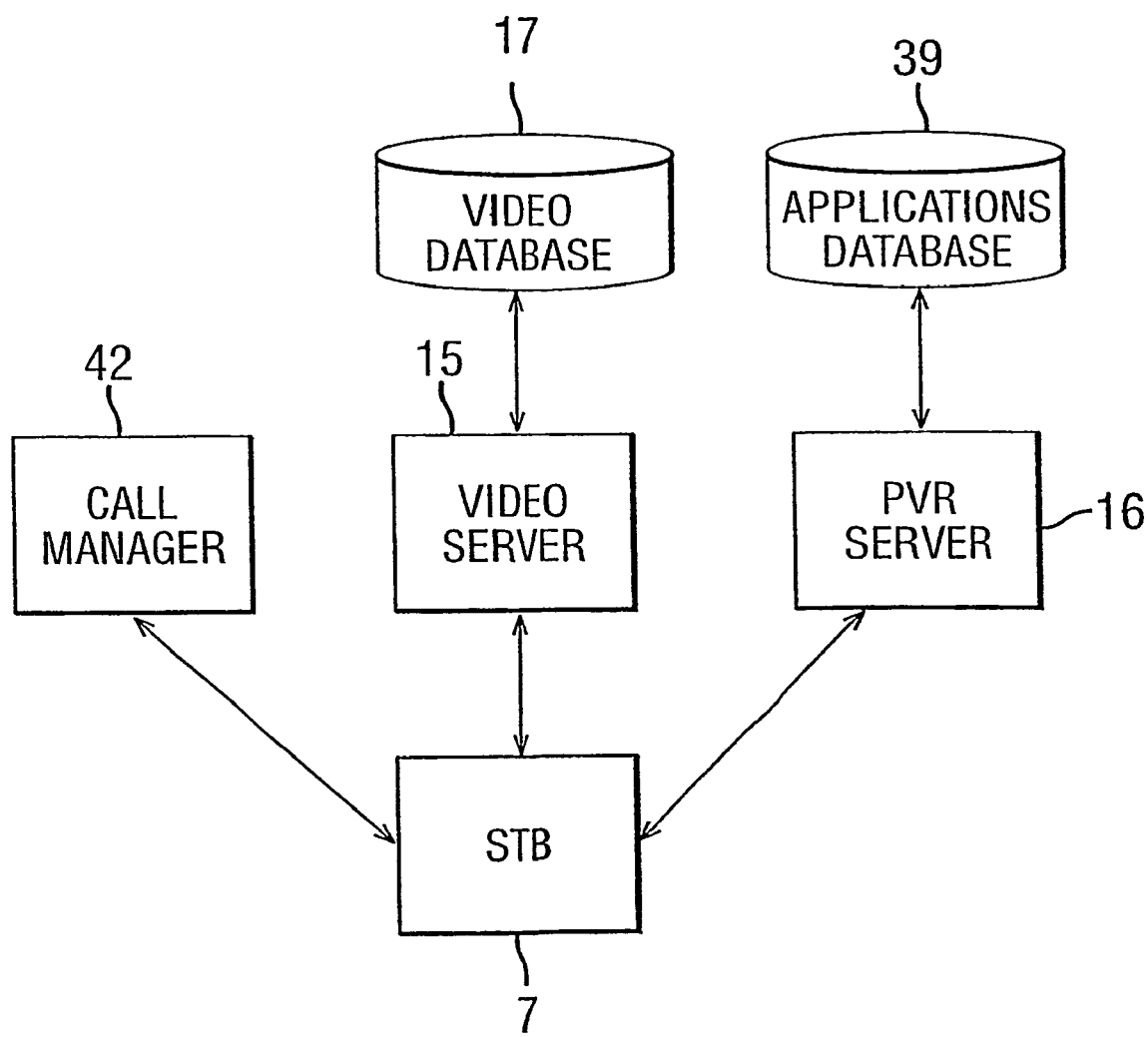
Figure 3B:
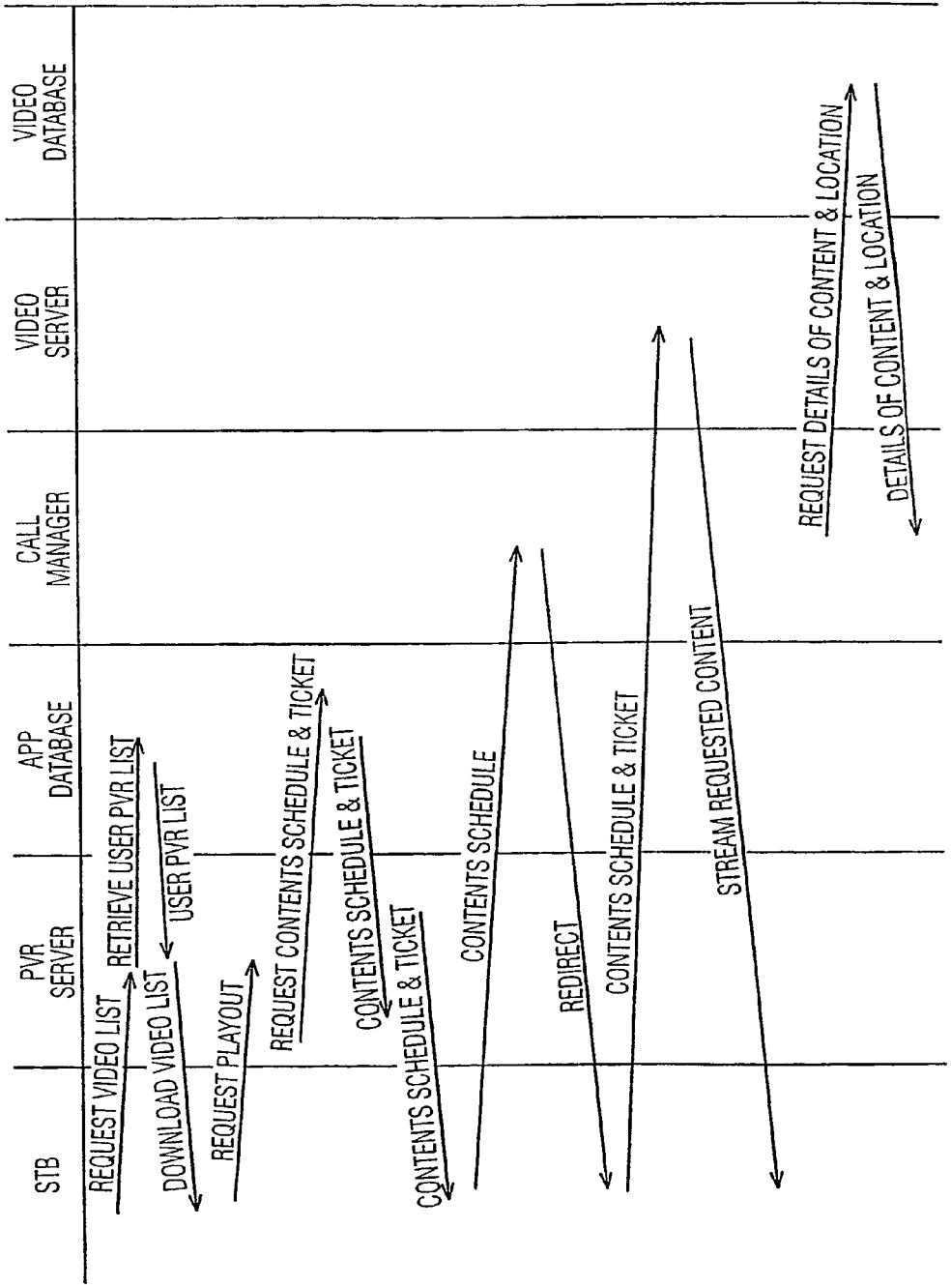
Figure 4:
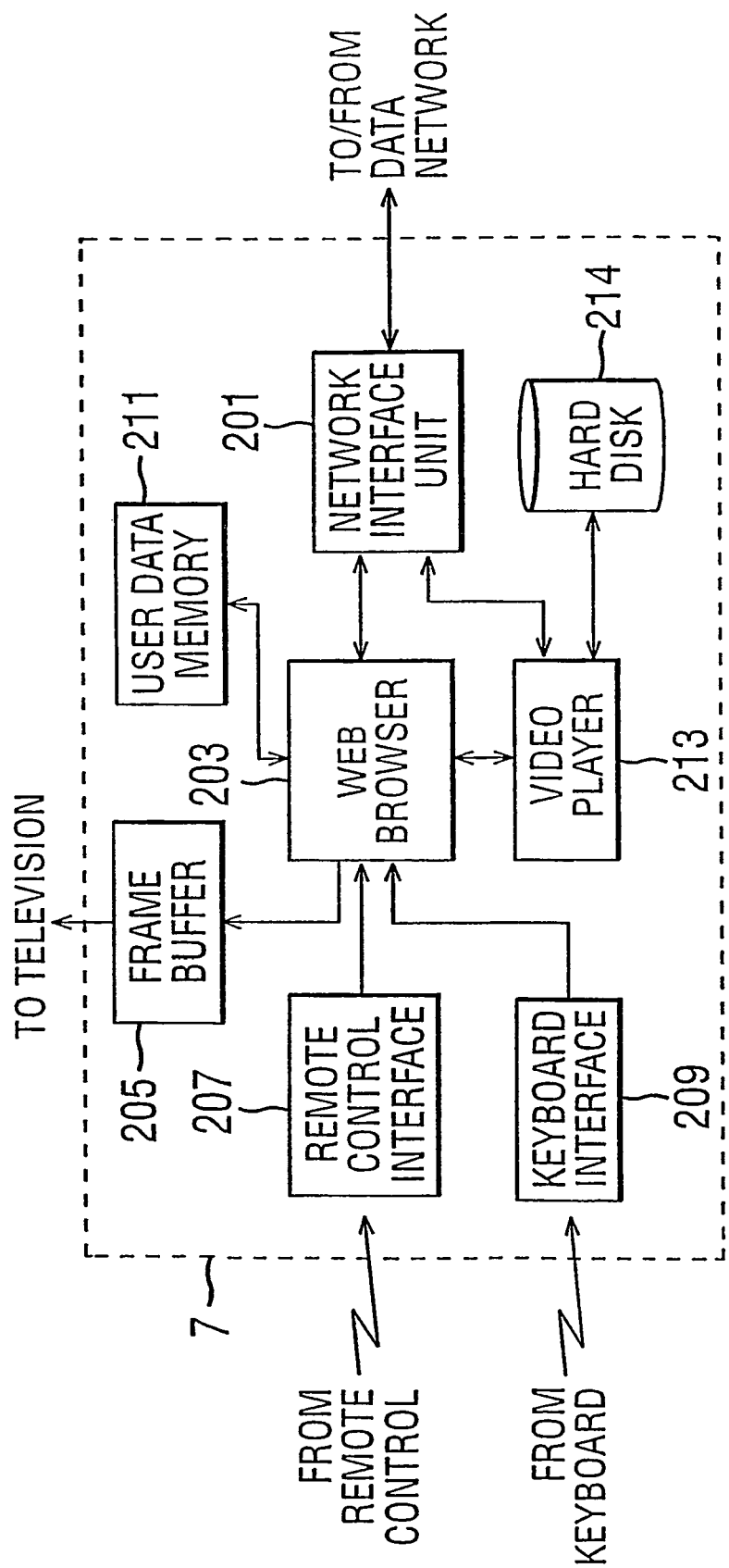
Figure 5:
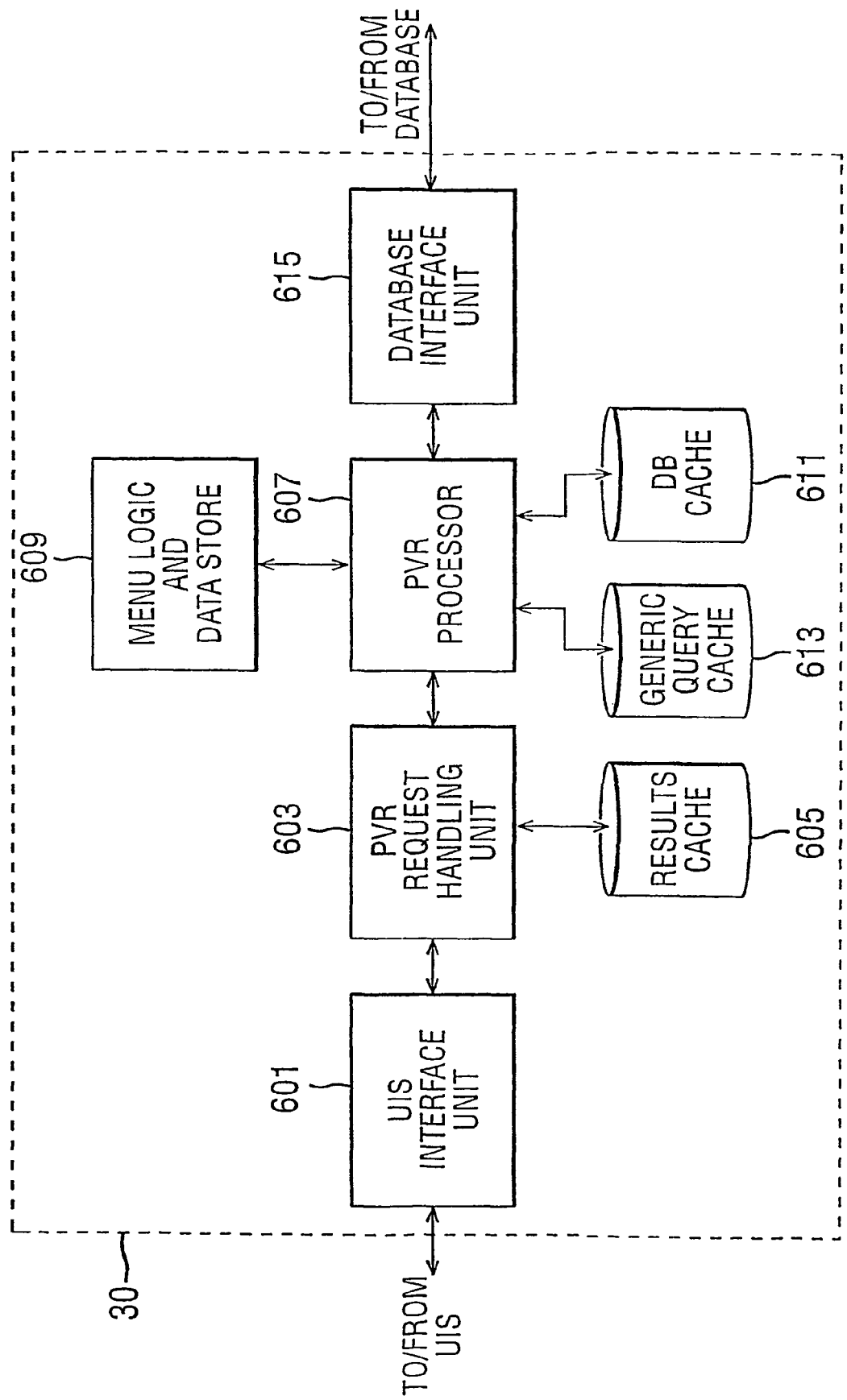
Figure 6:
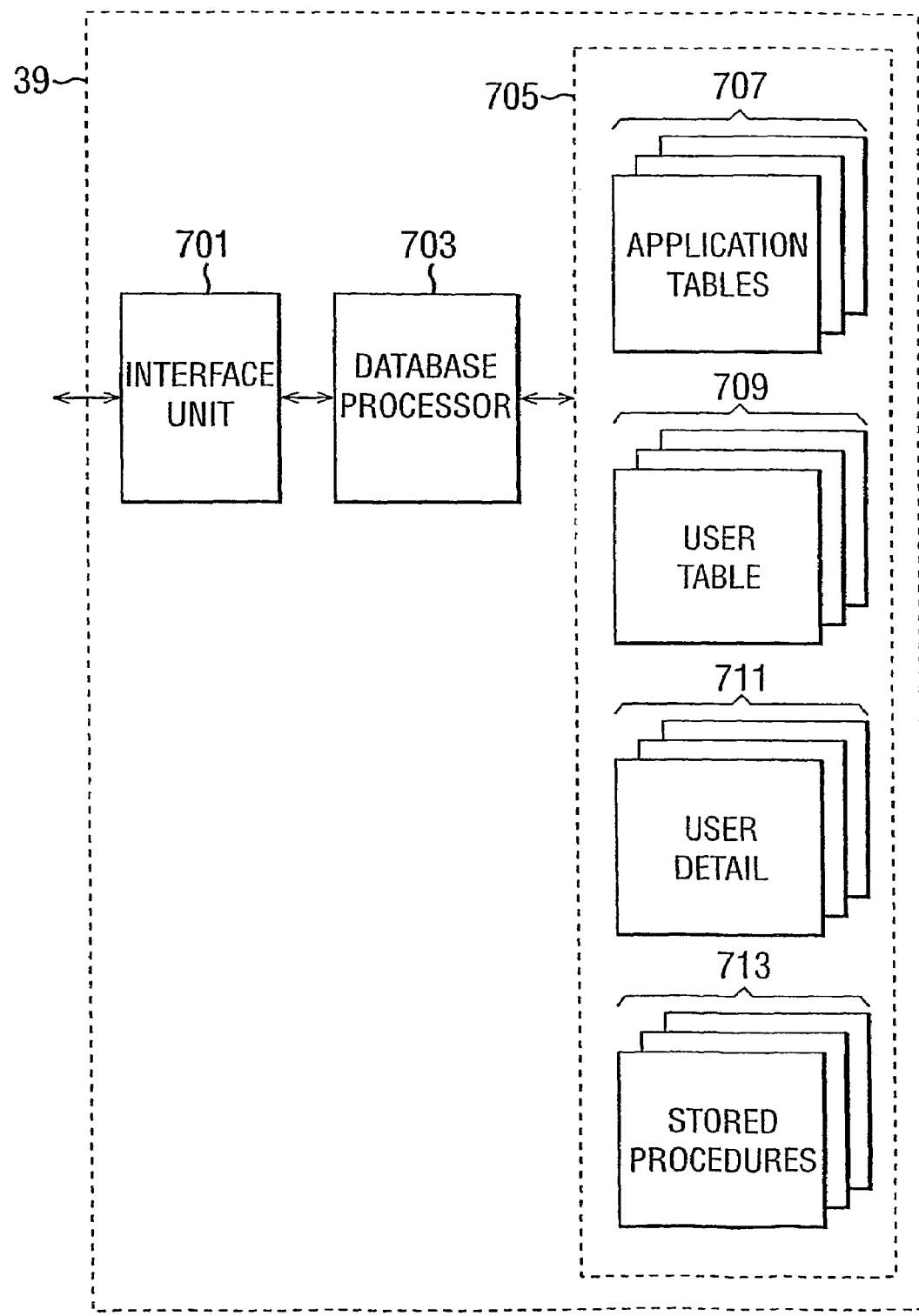
Figure 7:
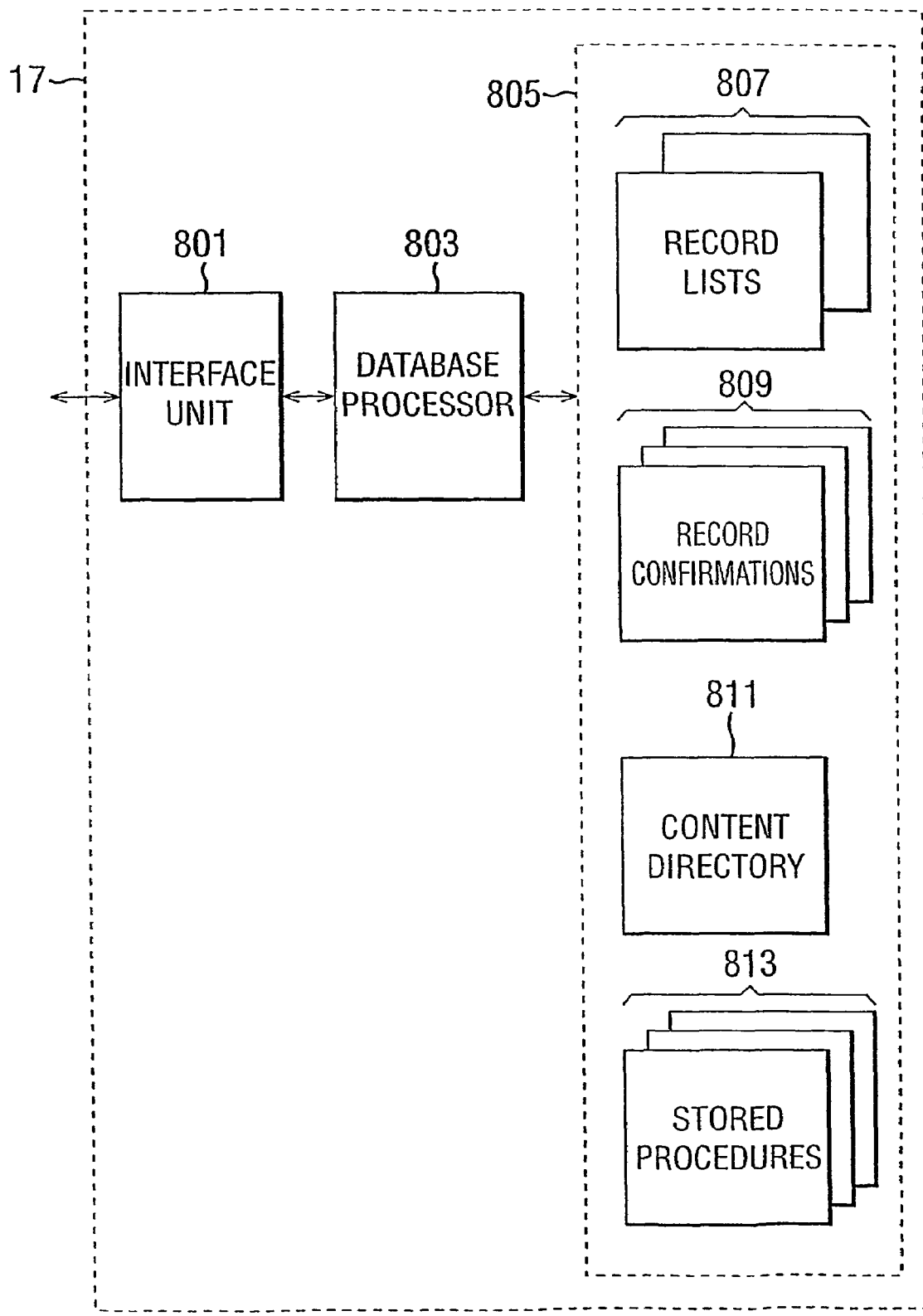
Figure 8:
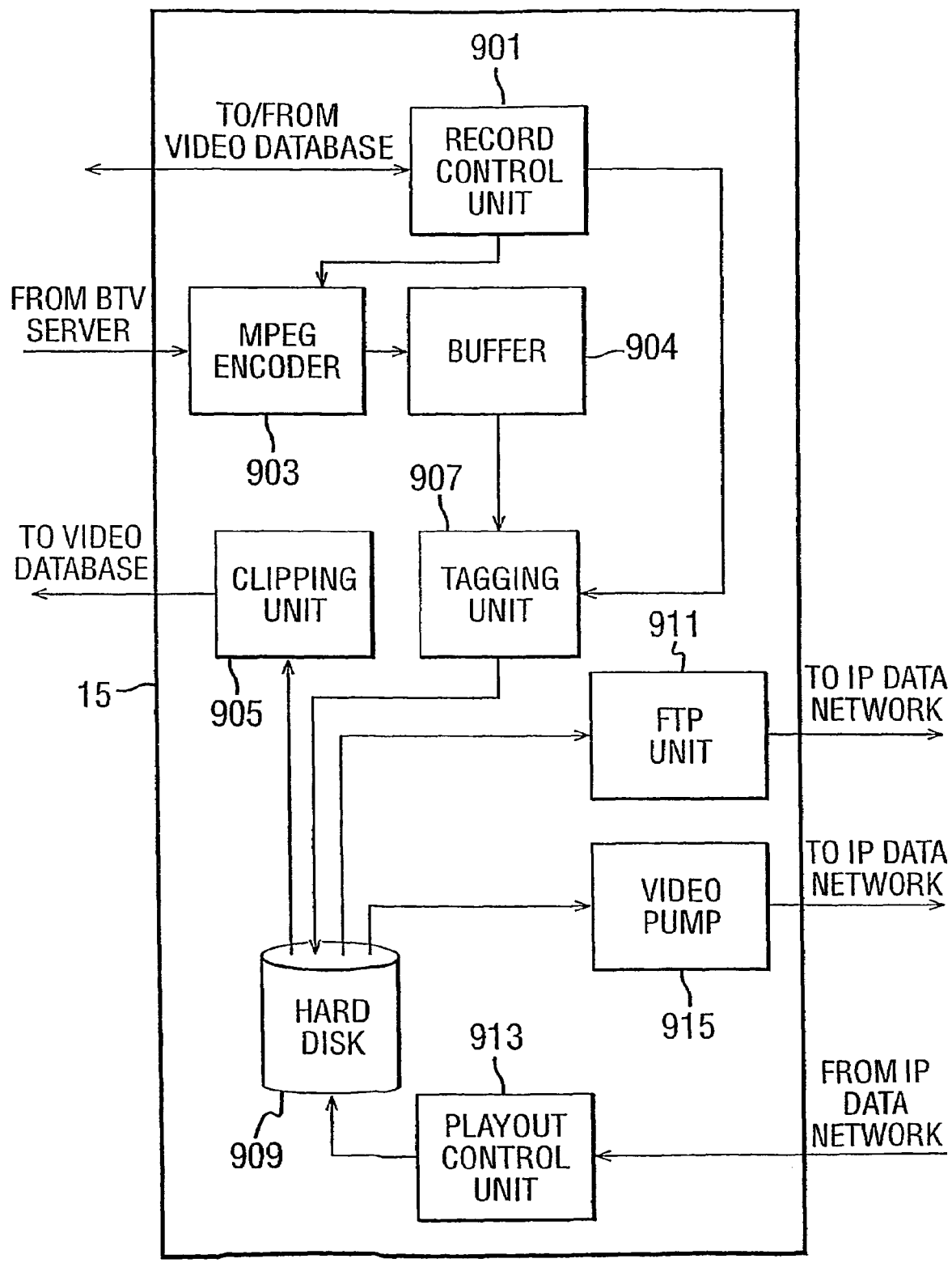
Figure 9:
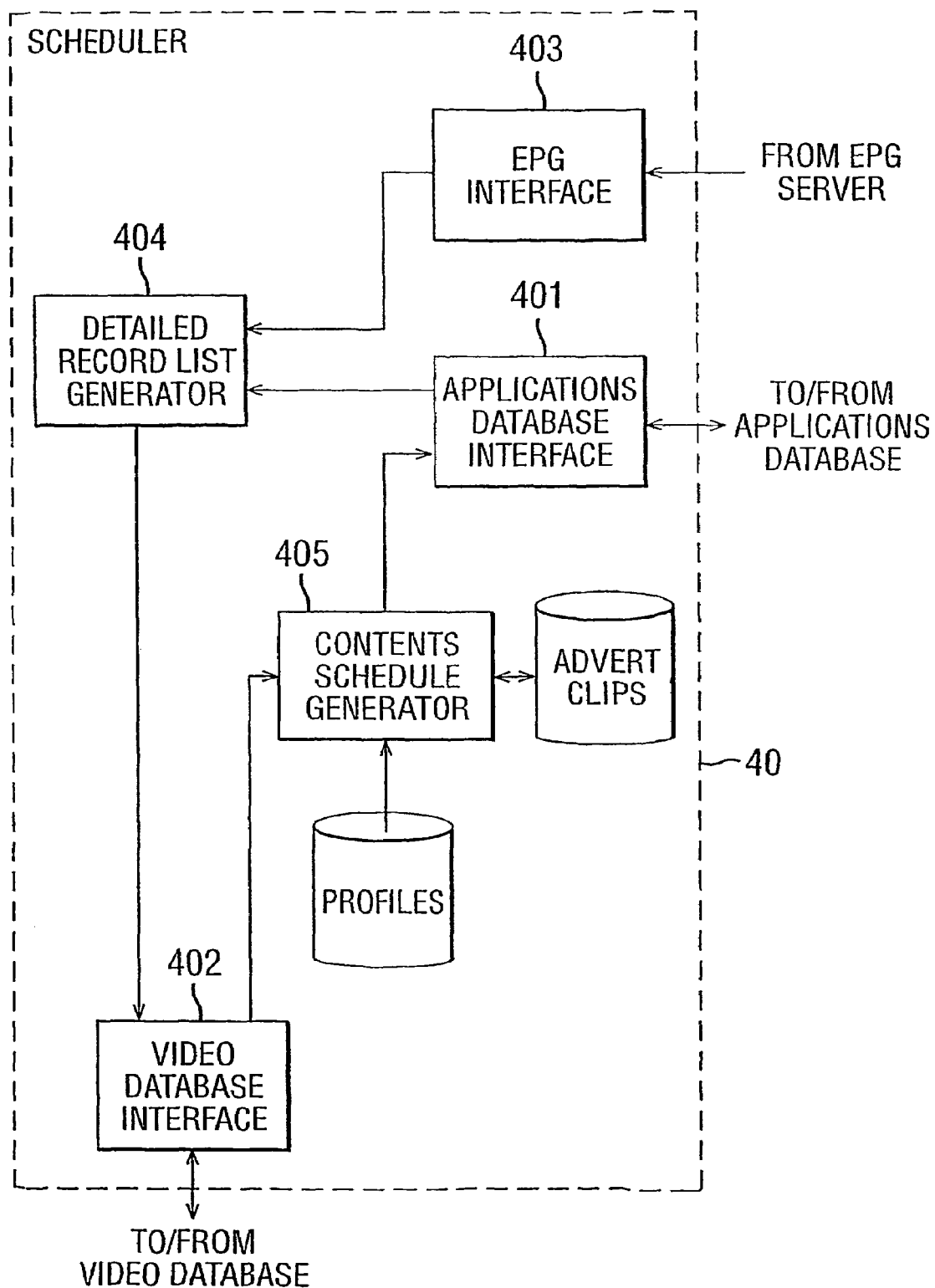

FIG. 2d schematically illustrates the portions of a programme that are recorded by a video server forming part of the system shown in FIG. 1 in response to a user request for the recording of that programme;

FIG. 3a is a functional block diagram illustrating the main components of the system shown in FIG. 1 which are used in the PVR system when a user requests playout of a programme that has been recorded;

FIG. 3b is a timing diagram illustrating the communications that are made between the components shown in FIG. 3a during this playout operation;

FIG. 3c is a graphical illustration showing part of a personal video recorder menu page generated by a personal video recorder server forming part of the system shown in FIG. 1;

FIG. 4 is a block diagram illustrating the main components of a user's set top box forming part of the system shown in FIG. 1;

FIG. 5 is a schematic block diagram illustrating the main components of a PVR server forming part of the system shown in FIG. 1;

FIG. 6 is a block diagram illustrating the main components of an applications database forming part of the system shown in FIG. 1;

FIG. 7 is a block diagram illustrating the main components of a video database forming part of the system shown in FIG. 1;

FIG. 8 is a block diagram illustrating the main components of a video server forming part of the system shown in FIG. 1; and FIG. 9 is a block diagram illustrating the main components of a scheduler forming part of the system shown in FIG. 1.

OVERVIEW

FIG. 1 is a schematic block diagram illustrating the main components of a system 1 which allows users to gain access to a plurality of services and content from a plurality of remote servers. The different users of the system 1 access the services and content via a respective user device 3, three of which are shown in FIG. 1 and referenced 3-1, 3-2 and 3-3. As shown in FIG. 1, in this embodiment, each user device 3 includes a television 5, a set top box (STB) 7, a remote control device 9 and a keyboard 11. Menus for accessing the various services and content that are available are displayed to the user on the television 5 and the user selects and controls the accessing of the services and content using the remote control 9 and/or the keyboard 11.

In this embodiment, the services that the user can access include:
i) video on demand (e.g. films on demand, music on demand, time shifted TV, personal video recorder, video commerce etc.) from a video server 15, a personal video recorder (PVR) server 16 and a video database 17;
ii) e-mail from a mail server 19 which is connected to the Internet via a firewall 20-1;
iii) an electronic programme guide (EPG) from an EPG server 21;
iv) Internet/world wide web access via a web server 25 and a fire wall 20-2;
v) broadcast TV (BTV) including basic television channels, premium channels, pay-per-view etc. provided by a BTV server 27 and a BTV receiver 28; and
vi) user services such as billing information, user profiles etc. provided by a management and billing server 29.

For ease of reference, the above servers will hereinafter be collectively referred to as application servers 30. It should be noted that in practice there will be many different video servers 15, mail servers 19, web servers 25 etc, geographically distributed over the region being serviced, with the user being directed to the most convenient server as appropriate.

As shown in FIG. 1, in this embodiment, the accessing of the services or content provided by the application servers 30 is carried out via a number of user interface servers 31, three of which are shown in FIG. 1 and referenced 31-1, 31-2 and 31-3. The user interface servers 31 are operable to receive user requests transmitted from the associated set top box 7 via an IP data network 33 and a load balancer 35 (which shares the user requests between the user interface servers 31, based on how busy each is) and to direct the request to the appropriate application server. In this embodiment, the user gains access to the different services and content provided by the application servers 30 via menu pages of a graphical user interface. In this embodiment, these menu pages are generated by the user interface server 31 and downloaded over the IP data network 33 as HTML (hypertext markup language) files to the set top box 7. A web browser (not shown) in the set top box 7 then generates or renders the appropriate menu page from the received HTML file, which it displays to the user on the television 5.

When a user makes a selection from a menu page (using the remote control 9 or the keyboard 11) an appropriate user request is generated by the user set top box 7 and transmitted back to the user interface server 31. In response, the user interface server 31 tries to generate the next menu page itself from data stored in local caches (not shown). If the data is not available locally, then the user interface server 31 passes the user request on to the appropriate application server 30 which obtains the requested content or data and passes it back to the user interface server 31. The user interface server 31 then uses the received data to generate a personalised HTML file which it transmits back to the user set top box 7.

The data necessary for generating the various menu pages and the various user profile data are stored centrally within an applications database 39 which can be accessed by any of the application servers 30 or by the user interface servers 31.

As described above, in this embodiment, the services or content of each application server 30 are accessed by the users from menu pages generated by the user interface servers 31. However, the resulting services or content may be delivered directly from the application servers 30 to the user or they may be delivered through the user interface server 31. In this embodiment, the application servers 30 which transmit large amounts of data to the users transmit their data directly to the users via the IP data network 33. These application servers 30 include the video server 15, the web server 25 and the broadcast TV server 27. The other servers (i.e. the PVR server 16, the mail server 19 and the EPG server 21) return their services through the user interface servers 31.

As those skilled in the art will appreciate, since the user interface servers 31 generate the menu pages used to gain access to the different services and content provided by the different application servers 30, the user interface server 31 can personalise each user's menu pages and can ensure a common "look and feel" to the menu pages regardless of the application server 30 being accessed. As a result, the user interface menu system of this embodiment is easier to understand, use and learn than those of the prior art systems available today. Further, the user interface servers 31 use intelligent caching techniques and user profiling information to personalise in an efficient way the menu pages downloaded to each user.

One of the novel features of this embodiment is the provision of personal video recorder (PVR) capabilities within the set top boxes 7 which are controlled by the PVR server 16. In particular, in this embodiment, the set top boxes 7 include a hard disc (not shown) for recording selected videos and/or television programmes. The selection of the content to be recorded is controlled by the user via the menu pages or automatically on the basis of predictions of what the system believes the user would like to watch, determined from user profile data collected and maintained by the management and billing server 29. Further, in this embodiment, video streams are also stored for each user within the video server 15. When the user wants to watch a video or television programme that has been recorded in their personal video recorder, they navigate through the server generated menu pages to retrieve their user specific PVR menu page identifying the content that is currently stored in their personal video recorder. When the user selects one of the items from their personal video recorder, an appropriate permission (e.g. electronic ticket) is downloaded from the PVR server 16 to the user's set top box 7 together with a link to a call manager 40 which stores the information about where the item is recorded—either on the user's set top box or in the video server 15. The user set top box 7 then uses the link to connect to the call manager 40 which in turn, redirects the user set top box 7 to retrieve the recorded programme either from the internal hard disc of the set top box 7 or from the appropriate video server 15.

In this embodiment, the video server 15 also buffers N hours (e.g. 24 hours) of broadcast on all channels received by the system, so that users can view programmes that they might have missed. In this embodiment, the users can gain access to this buffered content by arranging for the EPG server 21 to not only include details of programmes that are playing now and that are playing subsequently, but also to include details of programmes that have already been played within the previous N hours. The user can then gain access to the buffered content by selecting the appropriate programme from the EPG listing.

This buffering of each of the programme channels also allows the video server 15 to be able to provide "pause live TV" services to the users, in which users can press a pause button on the remote control 9 which results in the current programme that they are watching freezing for some predefined maximum time (which may vary between users depending on their user profile). If there is no user intervention during this predefined time, then the picture will jump back to the current point in the current programme being broadcast. However, if the user presses the play button then the system plays the programme from the point in the programme where it was paused. If the user presses the fast-forward button then the programme will fast-forward until the user resumes watching the live programme.

A brief description has been given above of the way in which users access services and content provided by a number of different application servers 30. A more detailed description will now be given of the PVR functionality of the system.

Personal Video Recorder

As described above, the interactive television system of the present embodiment is arranged to provide personal video recorder services to users in which the content stored for each user may be stored centrally within the network or stored in the user's set top box 7 and in which the accessing, capture and storage of the content is controlled by the PVR server 16 located in the network. The way in which this PVR system works with regard to the recording and subsequent playout of programmes will now be described in more detail with reference to FIGS. 2 and 3.

Recording

Figure 2A:
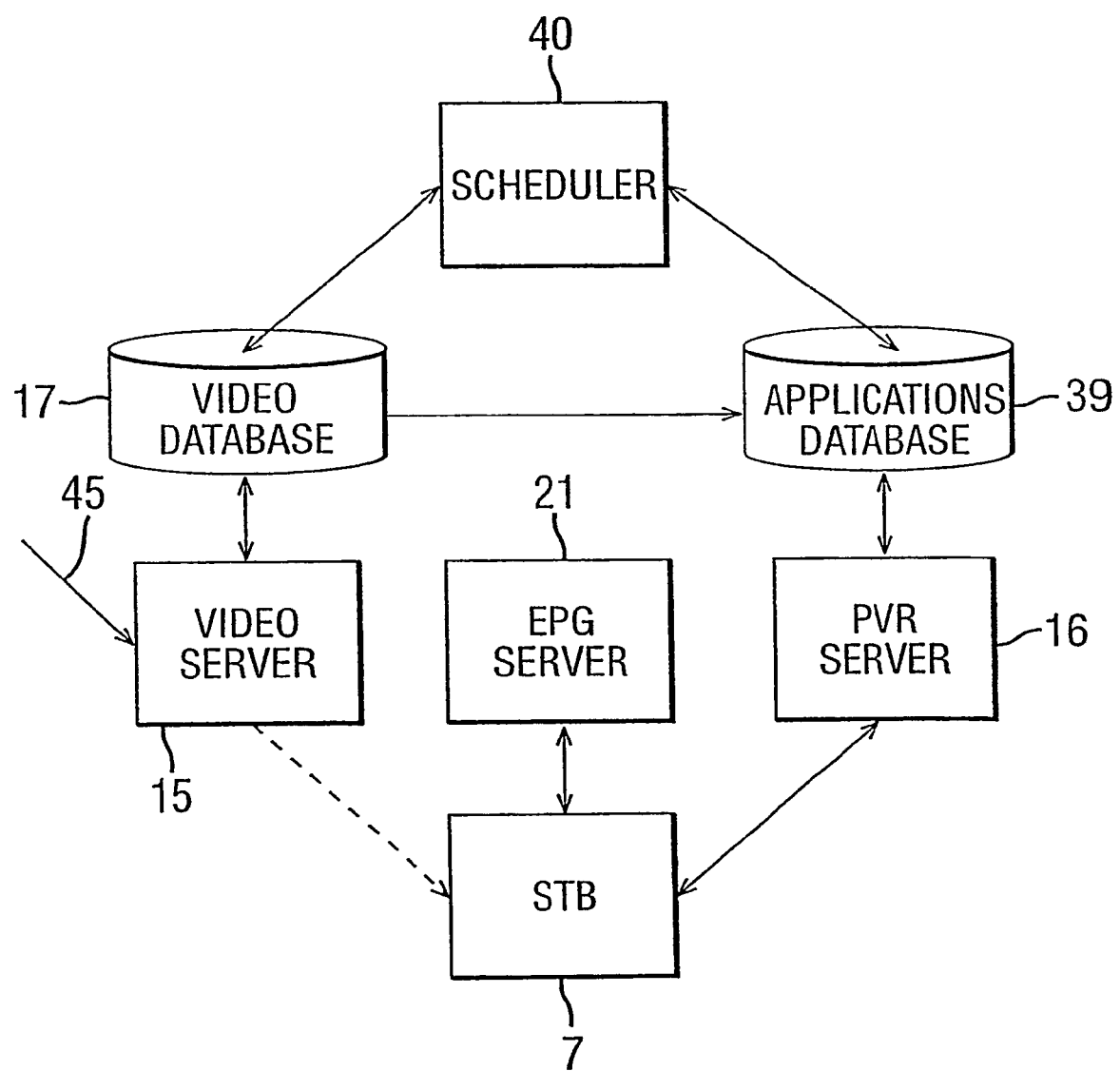
FIG. 2a is a functional block diagram illustrating the main components of the system shown in FIG. 1 which are used in the PVR system when a user requests a programme to be recorded.

FIG. 2a is a functional block diagram illustrating the main components of the system shown in FIG. 1 which are used in the PVR system when a user requests a programme to be recorded. FIG. 2b is a timing diagram illustrating the communications that are made between the components shown in FIG. 2a during this recording operation. In use, the main way in which users select programmes for recordal is via an electronic programme guide (EPG) downloaded from the EPG server 21. It is also possible, however, to select a programme for recordal from a promotion downloaded to the user's set top box 7 from one of the application servers 30. For example, the broadcast television server 27 may download a promotion advertising the future broadcasting of a given programme or movie and providing the user with the ability to select that programme or movie for recordal when it is broadcast. In the timing diagram shown in FIG. 2b, it is assumed that the programme to be recorded is selected from the electronic programme guide. Therefore, initially, the set top box 7 requests the electronic programme guide from the EPG server 21.

FIG. 2c illustrates the data typically included within such a user request 215. As shown, the request includes:

i) a source IP address 221 identifying the IP address of the set top box 7 that transmitted the request;

ii) a destination address 223 (in this embodiment, the URL address of the user interface server 31) identifying that the request is to be transmitted through the IP data network 33 to a user interface server 31;

iii) a current user ID 225 (which may include a smart-card ID) which identifies the current user that is watching and interacting with the set top box 7 (since in this embodiment more than one user can be associated to each set top box 7);

iv) a session ID 227 identifying a current user session to which the transmitted user request 215 relates; and v) an application identifier 229 and a screen identifier 231 which identify the application server 30 to which the request 215 should be transmitted and the particular menu page, service or content requested by the user.

When the user interface server 31 receives the request 215, it uses the application identifier 229 to forward the request, in this case, to the EPG server 21. As described in the applicant's earlier International application WO 02/082814, the user interface servers 31 include internal caches (not shown) for caching data for menu pages and content data from the different application servers 30 so that the user interface servers 31 can service some of the user requests 215 without having to pass the requests 215 on to the appropriate application server 30. The way in which this is achieved is described more fully in the applicant's above mentioned International application, the contents of which are incorporated herein by reference.

When the EPG server 21 receives the user request 215, it uses the current user ID 225 to identify the user making the request. The EPG server 21 then extracts user profile data from the applications database 39. This user profile data identifies the channels that the user has subscribed to, the user's age, preferences, language etc. The EPG server 21 then filters the entire EPG data (defining all of the programmes that are available to the system from all of the different sources) to remove programmes or channels which the user has not subscribed to or which the user is not allowed to watch because of their age or preferences. The EPG server 21 then passes the filtered EPG data back to the set top box 7 via the user interface server 31 as an HTML page. The set top box 7 then renders the HTML page to generate an EPG menu page showing the user the channels and programmes that they can watch and showing, through an appropriate visual symbol next to each programme, the programmes that are recordable and those that are not.

As those skilled in the art will appreciate, the electronic programme guide may be displayed to the user in a number of different formats. The preferred format is described in the applicant's earlier International application WO 02/082814 mentioned above. Regardless of how the EPG is displayed, the user can use the remote control 9 or the keyboard 11 to scroll through the programmes in the electronic programme guide and can select a programme either for current viewing or for recording when it is broadcast. The programmes for current viewing are those that are currently being broadcast live together with those that have been broadcast in the last N hours and which are buffered within the video server 15. If the user selects to record a programme that has not yet been broadcast, then a user request 215 similar to that shown in FIG. 2c is created and transmitted together with an appropriate application identifier 229 and screen identifier 231 to the PVR server 16 identifying the programme to be recorded. In response, the PVR server 16 updates a list (not shown) stored in the applications database 39, which list identifies the programmes to be recorded and the user or users who requested the recordal.

At predetermined intervals, a scheduler 40 retrieves this list of programmes to be recorded and processes it together with EPG data defining when those programmes are to be broadcast, to create a detailed record list (not shown) identifying the channel number and the start and stop time for each programme to be recorded. The scheduler 40 then passes this detailed record list to the video database 17 where a microscheduler (not shown) is run which processes the detailed record list on a regular basis in order to generate instructions for controlling the video server 15 to capture one or more of the programmes currently being broadcast (which it receives from the programme feed represented by arrow 45). The scheduler 40 is also responsible to monitor for changes in the EPG data reflecting changes in the times at which programmes are to be broadcast and to update the detailed record list accordingly.

In this embodiment, the microscheduler (not shown) forming part of the video database 17 processes the detailed record list once every minute. It therefore looks ahead for all programmes that are to be recorded which are due to start or end within the next minute and then generates the appropriate instructions for the video server 15. As a result, the video server 15 may record up to a minute of the previous programme and the subsequent programme in addition to the programme to be recorded. This is illustrated in FIG. 2d. In particular, FIG. 2d illustrates the entire segment 47 of video data (between times $t_0$ and $t_9$) that is recorded by the video server 15. The programme that is to be recorded is represented by the data between times $t_1$ and $t_8$. The additional data 49-1 and 49-2 between times $t_0$ and $t_1$ and $t_8$ and $t_9$ represent content data of the previous programme and the subsequent programme. The programme that is recorded may also include a number of adverts interspersed with the programme segments 51. These adverts are illustrated in FIG. 2d by the four advert sections referenced 50-1, 50-2, 50-3 and 50-4 which are interspersed between programme segments 51-1, 51-2 and 51-3.

During the capturing operation, the video server 15 encodes the received broadcast programme into an appropriate digital video format (such as MPEG), if it is not already in such a format. The video server 15 also generates tag data for the encoded video data which identifies the location (in terms of their temporal position within the sequence of video frames starting at the beginning of the programme) of the frames within the stream of video data. As is well known in the art, this tag data allows the user to be able to pause, fast-forward, rewind etc. through the stream of digital video data. The way in which such tag data is generated and used is described in, for example, U.S. Pat. No. 5,659,539, the contents of which are incorporated herein by reference.

As discussed earlier, the recorded content 47 (together with the corresponding tag data file) may either be stored in the video server 15 or within a hard disc in the user's set top box 7. The latter option is illustrated in FIG. 2b by the dashed arrow extending from the video server to the set top box. Since the downloading of the programme at that time is not for playout, the file does not have to be streamed in real time and can be "trickle-fed" at a lower data rate to the user's set top box 7 using, for example, a conventional file transfer protocol (FTP).

After the content 47 and the tag file have been stored either in the video server 15 or in the user's set top box 7, the video server 15 sends a confirmation of recordal signal back to the video database 17. The video database 17 then returns a confirmation of recordal back to the applications database 39. In this embodiment, the confirmation of recordal also includes permission data in the form of an electronic ticket which will be needed by each of the users in order to be able to play out the stored programme.

After the confirmation of recordal data has been written into the applications database 39, it can be processed by the personal video recorder server 16 which then updates user specific personal video recorder lists (not shown) stored in the applications database 39, which identify all the programmes that have been recorded for the user associated with the list. In this way, when the user transmits a request from their set top box 7 to the PVR server 16 requesting details of the programmes that are available within their personal video recorder, this list of programmes is downloaded to the set top box 7 which then renders the list in a menu page on the television 5. When this happens, the PVR server 16 effectively confirms to the user that the requested programme has been successfully recorded and can be accessed from their personal video recorder. Alternatively, a separate confirmation message may be transmitted from the PVR server 16 to the user's set top box 7 confirming the recordal of the content.

In this embodiment, before a recorded programme can be played out to a user, the scheduler 40 must generate a contents schedule for the recorded programme by processing clip data associated with the recorded programme, that is generated by a clipper unit (not shown) which forms part of the video server 15. This clip data identifies the boundaries between the extra content 49 and the programme segments 51 and the boundaries between the adverts 50 and the programme segments 51 in the recorded content (e.g. the location of times $t_1$ to $t_8$ shown in FIG. 2d). The generated clip data is given a name associated with the content that is recorded (for example, if the programme that has been recorded is Soap A, then the clip file might be named Soap A) and, as shown at the bottom of FIG. 2B, is stored in the video database 17. The processing of the content by the clipper unit to generate this boundary information is possible since the broadcast signal received by the video server 15 includes markers identifying the beginning and end of the programme segments 51 and the beginning and end of the adverts 50.

The contents schedules generated by the scheduler 40 identify the list of programme and advert segments that will be played out to the user when it is requested. In this embodiment, the scheduler 40 generates different contents schedules for different groups of users, depending on their user profile. In this way, the number and content of the adverts played out to each user can be varied depending on the user profile.

As shown at the bottom of FIG. 2B, after the scheduler 40 has generated the contents schedules, they are stored in the applications database 39. At regular intervals, the PVR server 16 monitors the contents schedules that are stored in the applications database 39 and identifies the adverts that are to be played out with the programme segments and ensures that the adverts are available at the playout location. In particular, if the content is stored in the user's set top box 7, then the PVR server 16 ensures that the adverts to be played out with the programme segments are downloaded in advance of playout in the user's set top box 7. In this way, when the user requests playout of the recorded content, all of the content defined in the contents schedule is stored locally within the user's set top box. Similarly, if the recorded content is stored in the video server 15, then the PVR server 16 ensures that the adverts for the different users are in the video server 15 that will deliver the recorded content, so that at the time of playout, the selected adverts are available for playout.

Playout

FIG. 3a is functional block diagram illustrating the main components of the system shown in FIG. 1 which are used in the PVR system when a user requests to view a programme that has been recorded in their personal video recorder. FIG. 3b is a timing diagram illustrating the communications that are made between the components shown in FIG. 3a during this playout operation. Initially, the user must download the list of programmes that are currently stored in their personal video recorder. This is achieved by selecting the appropriate menu option from the displayed menu pages, which causes a request for the user's personal video list to be transmitted from the set top box 7 to the PVR server 16. This request has a similar form to the request 215 shown in FIG. 2c, in which the application identifier 229 identifies the PVR server 16 and the screen identifier 231 indicates that the user wishes to view their personal video recorder list. The PVR server 16 then retrieves the user's PVR list from the applications database 39 which it then downloads to the user interface server 31. The user interface server 31 then creates an HTML file defining the menu page showing the user's PVR list, which it passes to the user's set top box 7 for display to the user on the television 5.

The user can then select one of the programmes from the list for playout using their remote control 9 or their keyboard 11. This results in another user request 215 being transmitted back to the PVR server 16 requesting playout of the selected programme. In response, the PVR server 16 retrieves the appropriate contents schedule and permission for the requested programme from the applications database 39. In this embodiment, the PVR server 16 can modify the contents schedule for each user in order to restrict the playout controls that the user has. For example, the PVR server 16 can mark one or more of the adverts in the contents schedule so that at the time of playout, the user cannot fast-forward through the marked adverts.

The PVR server 16 then transmits the contents schedule and the digital ticket back to the set top box 7 together with a URL address for the call manager 42. In response, the set top box 7 transmits the contents schedule to the call manager 42 which determines where the content in the contents schedule is stored (i.e. in a video server 15 or in the user's set top box 7). The call manager 42 then redirects the set top box 7 to the appropriate storage location. If the content is stored in the video server 15, then the set top box 7 will be redirected to transmit the contents schedule together with the digital ticket to the video server 15. In response, the video server 15 checks the validity of the digital ticket and, if it is valid, starts streaming the requested video data back to the user's set top box 7. If the programme is stored in the user's set top box 7 then the call manager 42 redirects the user to retrieve the video data from the hard disc within the set top box 7. A video player (not shown) in the set top box then checks the validity of the received digital ticket and if valid starts retrieving the content from the internal hard drive. The video data either read from the internal hard disc or received from the video server 15 is then decoded by the video player to regenerate the video frames which are output to the television 5 for display to the user.

During the playout of the recorded content, the user can press keys on the remote control 9 or the keyboard 11 to control the rate at which the content is played out. For example, the user can pause the content, fast-forward through the content or rewind back through previously output content. In the case where the content is being delivered from the video server 15, the user requested control action is transmitted to the video server 15. The video server 15 then checks that the requested action is allowable (as defined by the contents schedule as marked-up by the PVR server 16) and, if it is, then uses the tag data associated with the stored content to control the playout in accordance with the user request. If the content is being played out from the hard disc in the set top box 7, then the video player receives the user's control input and again checks with the contents schedule to confirm that the playout control requested is allowed. If it is allowed, then the video player uses the stored tag data associated with the content being played out, to control the rate at which the content is played out to the user in accordance with the user's request.

As those skilled in the art will appreciate from the above description, the call manager 42 must have details of where the different content is stored within the system. This information is stored in the video database 17 and is read out of this database by the call manager 42 on a regular basis. This operation is illustrated at the bottom of FIG. 3b. Although, as those skilled in the art will appreciate, for newly recorded content, this reading out of the location data from the video database 17 will have to be carried out before that new content can be accessed.

As mentioned above, in this embodiment, a number of different video servers 15 are provided which are geographically distributed over the area being serviced by the interactive television system. In this embodiment, the content is originally recorded in a central video server 15 provided at the head end of the system and then the content is distributed to the video servers 15 that are located near the users that requested the content to be recorded. Additionally, in this embodiment, several call managers 42 are provided which again are distributed over the geographical area covered by the interactive television system, with each call manager 42 receiving details of the content stored in video servers 15 within its locality.

PVR Menu Pages

As described above, in this embodiment the user accesses the PVR services provided by the PVR server 16 through a number of menu pages. In this embodiment, each user is allocated a certain amount of storage space within the system (which includes storage space in the video server 15 and in the user's set top box 7). In this embodiment, the home page (for display to the user) generated by the PVR server 16 operates to illustrate how the user's allocation of space is being used. FIG. 3c is a graphical illustration showing how the PVR server 16 illustrates this usage in this embodiment. In particular, the graphical illustration includes a usage bar 115 which graphically illustrates how the user's allocation of storage space within the system is being used up. In the illustration shown in FIG. 3c, the different portions in the usage bar 115 are:

i) permanent storage 117—programmes recorded in this part of the user's personal video recorder are never deleted;

ii) unused storage 119—this illustrates to the user the amount of free space the user has to record further programmes;

iii) suggestions 121—programmes recorded in this part of the user's personal video recorder are recorded automatically by the PVR server 16 based on what the PVR server 16 thinks the user might like to watch;

iv) unwatched 123—programmes in this part of the user's personal video recorder have been recorded by the user but have not yet been watched;

v) hot suggestions 125—programmes recorded in this part of the user's personal video recorder are recorded automatically by the PVR server 16 based on the user's preferences and favourites and which are considered by the PVR server 16 to be programmes that the user will want to watch; and vi) pause live TV 127—this part of the user's personal video recorder is reserved for recording a television programme that a user is currently watching if they wish to pause the programme.

From this PVR menu page, the user can then view the programmes in each of the different categories by pressing an appropriate button on the remote control 9 or the keyboard 11. When the user presses this key, an appropriate user request is then transmitted back to the PVR server 16 which retrieves details of the programmes stored in the requested part of the user's personal video recorder which it downloads back to the user's set top box 7 for display in a new menu page. The user can therefore view the suggestions made by the PVR server 16 and control their viewing and/or deletion. The user can also move programmes between the different categories. For example, the user can move a programme from the suggestions category 121 into the permanent storage category 117, again by pressing an appropriate key on the remote control 9 or the keyboard 11.

The PVR server 16 also provides a menu page to the user for defining rules (within the limits defined by the user's profile) for managing the storage and deletion of programmes in their personal video recorder. From this menu page, the user can define, for example, that any content that has been recorded on the basis of a suggestion may be deleted to make room for a user-selected recording and/or that no content should be deleted unless it has been watched etc. Once defined by the user, these management rules are transmitted to the PVR server 16 which then stores them in the applications database 39. The PVR server 16 then uses these rules to control the deletion and recording of programmes in the user's personal video recorder.

A description will now be given of the main components forming part of the system shown in FIG. 1 which are used to provide the personal video recorder services.

Set Top Box

FIG. 4 is a functional block diagram illustrating the main components of one of the set top boxes 7 shown in FIG. 1. As shown in FIG. 4, the set top box 7 includes a network interface unit 201 which operates to interface the set top box 7 to the IP data network 33. HTML menu pages received from the user interface server 31 over the IP data network 33 are passed, through the network interface unit 201, to a web browser 203. The web browser 203 then renders the HTML menu page for display, which it outputs to a frame buffer 205 for display on the television 5. The web browser 203 is also operable to receive user input either from the remote control 9 via the remote control interface 207 or from the keyboard 11 via the keyboard interface 209. The user input may be used, for example, to scroll through options on the currently displayed menu page and/or to select options from the current menu page. The menu data file received from the user interface server 31 also includes links for other menu pages and/or services and content that is available from the current menu page and instructions for the web browser 203, which associates key presses on the remote control 9 and/or the keyboard 11 to these links. When the user presses a key on the remote control 9 and/or the keyboard 11, the web browser 203 then interprets this key press based on the received instructions to identify the link that the user has selected. In this embodiment, these instructions are Javascript instructions and the web browser 203 includes an appropriate Javascript command processor (not shown) for interpreting the instructions. The web browser 203 then generates an appropriate user request 215 for transmission to a user interface server 31.

The set top box 7 also includes a video player 213 (such as an MPEG decoder) which operates under control of the web browser 203. In particular, the web browser 203 can control the video player 213 to request a particular video stream from the video server 15 or a particular television channel from the broadcast television server 27. The stream of video or television channel data received from the IP data network 33 is then passed through the network interface unit 201 to the video player 213. In accordance with instructions from the web browser 203, the video player 215 then either processes the received video or television channel data or it stores it unprocessed within a local hard disc 214 for future playout. As those skilled in the art will appreciate, since the video player 215 does not process received video or television channel data which is to be stored in the hard disc 214, it can receive multiple streams for different videos and/or television programmes and can store these separately in the hard disc 214. This is possible, since each data packet received from the IP data network 33 will include an identifier identifying to which stream the packet belongs. Additionally, in this case since the received video or television channel data is not for current viewing, the data can be "trickle-fed" to the set top box 7 at a reduced data rate than would be required for streams of video or television programmes that are to be viewed in real time. As discussed above, in this embodiment, personalised user adverts may also be downloaded for storage in the hard disc 214, for insertion within the video or television programme during playout.

At the time of playout or if the received stream of video or television channel data is not to be stored in the hard disc 214, then the video player 215 processes the data to regenerate the frames of the video or television channel, which it then passes back to the web browser 203. The web browser 203 then outputs the received video or television channel frames to the frame buffer 205 for display on the television 5. In this embodiment, the web browser 203 can control the size of the video or television channel frames displayed to the user on the television 5 so that, for example, the video or television channel is displayed to the user in a portion of the television screen, with the remainder of the screen being used to display menu options that are available.

As described above, during the playout of stored content, the user can control the rate at which the content is played out (for example to pause, fast-forward, rewind etc.). These playout control commands are received by the web browser 203 via the remote control interface 207 or the keyboard interface 209 and either passed to the video player 213 if the content is being read out from the hard disc 214 or is transmitted to the remote video server 15 via the network interface unit 201 if the content is being received from the remote video server 15. The video player 213 or the remote video server 15 then controls the playout of the stored content based on the user's request (provided of course that the requested playout control is allowed as defined by the contents schedule).

PVR Server

The PVR server 16 receives user queries from the user interface servers 31 together with user details. The PVR server 16 operates to deliver the user's requested service or menu page by processing the received request and data and by retrieving data relevant to the request from the applications database 39. In order to increase performance in the system 1 and to meet the goal of limiting the queries on the applications database 39, the PVR server 16 is designed, in this embodiment, to utilise efficient caching.

FIG. 5 is a schematic block diagram illustrating the main components of the PVR server 16 used in this embodiment. As shown, the PVR server 16 includes a UIS interface unit 601 for interfacing the PVR server 16 to the user interface servers 31. The UIS interface unit 601 is operable to receive user requests 215 together with added user information provided by the user interface servers 31 which it passes to a PVR request handling unit 603. The PVR request handling unit 603 processes the received data to determine: (i) if the request should be rejected; (ii) if the user request can be responded to from data stored in a results cache 605; or (iii) if the user request should be forwarded to a PVR processor 607. In particular, in this embodiment, the PVR request handling unit 603 checks to ensure that each user request that it receives is for the PVR server 16. It does this by checking the application identifier 229 forming part of the user request 215 with the application identifier associated with the PVR server 16. If these identifiers are different, then the PVR request handling unit 603 rejects the user request and returns an appropriate error code back to the user interface server 31.

In this embodiment, the PVR server 16 generates XML files that describe the information to be inserted within a menu page. These XML files are designed to be generic in nature so that they can be processed by any of the user interface servers 31 and so that they can be used for servicing user requests received from other users. In this embodiment, the XML files generated for previous user requests are stored for a predetermined period of time in the results cache 605. Therefore, when the PVR request handling unit 603 receives a valid user request, it checks the XML files stored in the results cache 605 to determine if the XML file for responding to the current user request is stored in this cache 605. If it is, then the PVR request handling unit 603 retrieves the XML file from the results cache 605 and returns it to the user interface server 31 that transmitted the user request. The application request handling unit 603 also informs the user interface server 31 that this XML file is cachable and for how long it is cachable. The XML file is also returned together with data identifying the user who made the request.

If the PVR request handling unit 603 determines that it cannot service the user request from previously generated XML files stored in the results cache 605, the PVR request handling unit 603 passes the user request 215 and the user information received from the user interface server 31 to the PVR processor 607. In this embodiment, it is the PVR processor 607 that determines what service and/or what menu page the user is requesting. The PVR processor 607 does this using the screen identifier 231 forming part of the received user request 215 and data stored within a menu logic and data store 609. In particular, the menu logic and data store 609 stores data associated with each possible screen identifier 231 which defines the information to be displayed in the next menu page together with menu logic defining what user selections can be made on that page or defining the data to be written into the applications database 39. Therefore, when the PVR processor 607 receives a user request, it identifies the screen identifier 231 forming part of the received user request 215 and it retrieves the appropriate data and menu logic from the store 609. The PVR processor 607 then processes the retrieved data and the user data received with the request to determine what information it needs to respond to the request and to determine if it needs to retrieve any of that information from or write any of that information to the applications database 39. For example, the PVR processor 607 may determine that the user is requesting their personal video list and this data is not cached, in which case the PVR processor 607 must retrieve the user's PVR list from the applications database 39. Alternatively, the user's request may be a request to record a programme that is to be broadcast at some point in the future. In this case, the PVR processor 607 writes data into the applications database 39 identifying the programme that is to be recorded for that user, for subsequent processing by the scheduler 40.

If the PVR processor 607 determines that it does need to query the database 39, then it first checks a database (DB) cache 611 and a generic query cache 613 which store results of previous requests for data sent to the applications database 39. If the required information is not stored in these caches, then the PVR processor 607 formats an appropriate database query and outputs it to the applications database 39 via a database interface unit 615. When the PVR processor 607 receives the raw database data (such as the user's PVR list) back from the database 39, it stores it in the DB cache 611. The PVR processor 607 then processes the returned database data to obtain the requested information (such as a list of the programmes that have been recorded for that user but which have not been watched) in a format suitable for returning to the user, which it stores in the generic query cache 613.

In this embodiment, the database cache 611 stores the data that is most frequently used by the PVR server 30 and is refreshed on a regular basis or when triggered by the applications database 39. When the data in the database cache 611 is updated in this way, the PVR processor 607 also reprocesses the data in order to refresh the data within the generic query cache 613. In this way, the data within these caches can be kept up-to-date for responding to subsequently received user requests.

After the PVR processor 607 has obtained the relevant information for responding to the user request, it passes the information together with the appropriate menu logic (defining allowed user selections and links therefor etc.) back to the PVR request handling unit 603. The PVR request handling unit 603 then packages the information and the menu logic into an XML file which it stores in the results cache 605 and which it returns to the user interface server 31 in the manner discussed above.

Applications Database

The applications database 39 is the single area of the system 1 where all the user's details, transactions and application data are stored. The applications database 39 is responsible for maintaining this data and for delivering it to the application servers 30 in a controlled manner. The applications database 39 is also responsible for notifying the application servers 30 and the user interface servers 31 when data within the applications database 39 has changed, so that the internal caches of the servers 30 can be updated.

FIG. 6 is a block diagram illustrating the main components in the applications database 39. As shown, the applications database 39 includes an interface unit 701 which operates to interface the applications database 39 with the application servers 30, the scheduler 40, the user interface servers 31 and the video database 17. Received database queries or inputs are passed to a database processor 703 which processes data within database tables 705 to respond to the query or which writes new data within the tables 705 in response to the received inputs. As shown in FIG. 6, the database tables 705 include a number of application tables 707 which store data relevant to the different application servers 30. For example, these tables store the list of programmes to be recorded that is added to by the PVR server 16 and that is processed by the scheduler 40. The database tables 705 also include user tables 709 which store the various user information and details used by the application servers 30 and the user interface servers 31. This information includes, for example, the user name, user family name, user status, user login name, user login password, user login PIN, user E-mail address, user favourites, user language, user colour, user country, user PVR list, etc. The database tables 705 also include user detail tables for storing user account information, billing information and details of items purchased etc. Finally, the database tables 705 also include a set of stored procedures 713 which can be invoked upon request from, for example by an application server 30 or a user interface server 31, in order to process some of the data within the database tables 705. For example, the stored procedures may be used to process the electronic programme guide which provides programme listings for all channels available from the broadcast TV server 27, to determine the programmes that are playing now on a selection of the TV channels. The result of this procedure can then be used to generate an EPG menu page for a user.

In addition to responding to queries received from application servers 30, the database processor 703 is also operable to transmit triggers to the various servers in order to refresh the caches within those servers. In particular, if an application server 30 or one of the user interface servers 31 writes data into the database tables 705, the database processor 703 generates appropriate triggers which it outputs to the other servers within the system 1 so that they can update the relevant parts of their caches. In this way, the database processor 703 can control the synchronisation of the cached data within the system 1.

Video Database

The video database 17 has the same general structure as the applications database 39 and is shown in more detail in FIG. 7. In particular, the video database 17 includes an interface unit 801 which operates to interface the video database 17 with the video server 15, the scheduler 40, the call manager 42 and the applications database 39. Database queries or inputs received in the interface unit 801 are passed to a database processor 803 which processes data within database tables 805 to respond to the query or which writes received input into the database tables 806. As shown in FIG. 7, the database tables 805 include record lists 807 which are received from the scheduler 40 and which identify the programmes to be recorded. The database tables 805 also include record confirmations 809 which are generated by the video server 15 after programmes have been recorded successfully and a content directory 811 which contains the above described clip files which detail the content which has been recorded and its storage location. Finally, the database tables 805 also include a set of stored procedures 813 which can be invoked upon request in order to process some of the data within the database tables 805. For example, in this embodiment, the stored procedures 813 include a procedure for carrying out the microscheduler functionality described above, which processes the record lists 807 to generate control instructions for controlling the recording operation of the video server 15.

Video Server

As discussed above, the video server 15 operates to provide video on demand services to users and to record programmes for users for subsequent playout. In this embodiment, the video server 15 also buffers the programmes broadcast on all channels for the last N hours, so that users can watch programmes that have already been broadcast.

FIG. 8 is a schematic block diagram illustrating the main components of the video server 15 used to record the content in this embodiment. As shown, the video server 15 includes a record control unit 901 which operates to receive (from the microscheduler in the video database 17) the details of the channels to be recorded, and the start and stop instructions for recording on those channels. In response, the record control unit 901 controls the operation of a number of MPEG encoders 903 (only one of which is shown for clarity). The MPEG stream of data generated by the MPEG encoder 903 is then buffered in a buffer 904 before being passed to a tagging unit 907 which generates the above described tag data which allows users to be able to fast-forward, rewind etc., through the recorded programme. The MPEG data and the associated tag data output by the tagging unit 907 is then stored in the hard disc 909.

At some point after being captured, the stored MPEG data is then processed by the clipping unit 905 to generate the above described clip files which identify the boundaries between the programme segments and adverts within the MPEG data. As shown in FIG. 8, these clip files are then passed to the video database 17 for storage and for processing by the scheduler 40. If the recorded programme is to be stored in the user's set top box 7, then the MPEG data for the recorded programme together with the corresponding tag data can be downloaded to the user's set top box 7 after the clipping unit 905 has generated the clip files. In this embodiment, if the MPEG data and the tag data is to be stored locally within the user's set top box 7, then it is downloaded using a file transfer protocol (FTP) unit 911.

In this embodiment, the record control unit 901 monitors the progress of the recording, tagging and clipping operations and generates the appropriate confirmation data which it writes back to the video database 17. The record control unit 901 also controls the tagging unit 907 so that it can read out and tag multiple versions of the same recorded MPEG data stream. For example, the video server 15 may be arranged to record in one file 24 hours of news on one channel and a separate request may be received from one or more users requesting recordal of just the Nine O'Clock News on the same channel. In this case, the two video files can be generated by reading the video data twice from the buffer 904 and generating separate tag data for the two video files by the tagging unit 907. The record and control unit 901 achieves this by comparing newly received record instructions with the channels that it is already recording and, if the content is already being captured, then the record and control unit 901 instructs the tagging unit 907 to read out and tag the appropriate number of copies of the recorded (or captured) MPEG data.

As shown in FIG. 8, the video server 15 also includes a playout control unit 913 which operates to receive requests (including contents schedules) from users for programme files which are stored in the hard disc 909. The playout control unit 913 also operates to verify the permission received from the user requesting the programme file. If the permission is valid, the playout control unit 913 causes the requested programme file or the sequence of programme and advert files (as defined by the contents schedule) to be read out from the hard disc 909 and streamed in the appropriate sequence to the user via the video pump 915, so that the user can decode the files and view the video content in real time. The playout control unit 913 also receives playout control requests (e.g. fast-forward, rewind, pause etc.) from the user for controlling the playout of the video content. In response to receiving such a playout control request, the playout control unit 913 checks the contents schedule to ensure that the requested playout control is not prohibited and, if it is not, uses the tag data associated with the content being streamed to control the data that is streamed to the user, thereby controlling the rate at which the video content is played out to the user.

Scheduler

As discussed above, the scheduler 40 operates to generate contents schedules for each recorded programme, which define the sequence of programme segments and adverts that will be played out to the different users of the system who requested recording of that content. A more detailed description of the scheduler 40 will now be given.

FIG. 9 shows in more detail the main components of the scheduler 40. As shown, it includes an applications database interface 401 for interfacing with the applications database 39, a video database interface 402 for interfacing with the video database 17 and an EPG interface 403 for interfacing with the EPG server 21. The scheduler 40 also includes a detailed record list generator 404 which generates the above described detailed record list (from the data in the applications database 39 and from EPG data) which it stores in the video database 17. The scheduler 40 also includes a contents schedule generator 405 which is connected to the video database interface 402 and to the applications database interface 401. The contents schedule generator 405 reads the clip files from the video database 17 via the video database interface 402, from which it generates the above described contents schedules.

For example, if the recorded content 47 illustrated in FIG. 2D represents a recording of a thirty minute soap programme (called Soap A) with two breaks for adverts, then the clip data might include:

i) a master clip called "Soap A" which represents the whole of the recorded content 47 from time $t_0$=zero to time $t_9$=1860000 ms (milliseconds);
ii) a derived clip called "$P_1$" which represents the part of the recorded content corresponding to the first part of the soap programme from time $t_1$=40000 ms to time $t_2$=570000 ms;
iii) a derived clip called "$ad_1$" which represents the part of the recorded content corresponding to the first advert in the first advert break from time $t_2$=570000 ms to time $t_3$=600000 ms;
iv) a derived clip called "$ad_2$" which represents the part of the recorded content corresponding to the second advert in the first advert break from time $t_3$=600000 ms to time $t_4$=630000 ms;
v) a derived clip called "$P_2$" which represents the part of the recorded content corresponding to the second part of the soap programme from time $t_4$=630000 ms to time $t_5$=1170000 ms;
vi) a derived clip called "$ad_3$" which represents the part of the recorded content corresponding to the first advert in the second advert break from time $t_5$=1170000 ms to time $t_6$=1200000 ms;
vii) a derived clip called "$ad_4$" which represents the part of the recorded content corresponding to the second advert in the second advert break from time $t_6$=1200000 ms to $t_7$=1230000 ms;
viii) a derived clip called "$P_3$" which represents the part of the recorded content corresponding to the third part of the soap programme from time $t_7$=630000 ms to time $t_8$=1170000 ms.

As mentioned above, this clip data is generated by a clipper unit in the video server 15 and is then stored in the video database 17. The scheduler 40 then reads and processes this clip data to generate the contents schedule for the recorded content 47, which defines the sequence of content that will be played to the user at the time of playout. In this embodiment, the scheduler 40 creates different content schedules for different user profiles.

In particular, in this embodiment, users can subscribe to three different levels of service: a gold service, a silver service and a bronze service, and the scheduler 40 creates different content schedules for each recorded programme for each of these different levels of service. In particular, the scheduler 40 generates a contents schedule for users who have subscribed to the gold service, which ensures that only the programme segments are played out to the users without any adverts. For users who have subscribed to the silver package, the scheduler 40 generates a contents schedule which inserts single adverts between the programme segments. Finally, for users that have subscribed to the bronze package, the scheduler 40 generates a contents schedule that inserts multiple adverts between the programme segments.

As those skilled in the art will appreciate, since the clipper unit has identified the locations of all of the programme segments and adverts in the recorded content, the scheduler 40 can replace the originally recorded adverts with other adverts. This substitution of adverts may be the same for all users within the subscription profile or it may be carried out on a per user basis. In the latter case, different content schedules will therefore be generated for the different users who requested the content to be recorded.

In this embodiment, the scheduler 40 generates the above described contents schedules by creating a list of clips that should be played out sequentially. This list refers to the clips that are derived by the clipper unit 905 from the recorded content 47. For example, the scheduler 40 may generate the following contents schedules for the recorded content 47 illustrated in FIG. 2D.

| GOLD SUBSCRIBERS CONTENTS SCHEDULE | SILVER SUBSCRIBERS CONTENTS SCHEDULE | BRONZE SUBSCRIBERS CONTENTS SCHEDULE |
|---|---|---|
| $P_1$ | $Ad_x$ | $Ad_x$ |
| $P_2$ | $P_1$ | $P_1$ |
| $P_3$ | $Ad_1$ | $Ad_1$ |
|  | $P_2$ | $Ad_2$ |
|  | $Ad_y$ | $P_2$ |
|  | $P_3$ | $Ad_x$ |
|  | $Ad_z$ | $Ad_y$ |
|  |  | $P_3$ |
|  |  | $Ad_3$ |
|  |  | $Ad_z$ |

After the scheduler 40 has generated the contents schedules for the recorded content 47, it stores them in the applications database 39. At regular intervals, the PVR server 16 monitors the contents schedules that have been stored in the applications database 39 and identifies the adverts that are to be played out with each recorded programme and ensures that, if the programme is stored in the user's set top box 7, the required advert data is also downloaded for storage in the user's set top box 7. In this way, if the programme is stored locally in the user's set top box 7, then at the time of playout, all of the content in the contents schedule defining the programme to be played out, can be retrieved and played sequentially to recreate the recorded programme together with the personalised adverts. Similarly, if the content is stored in the video server 15, then the PVR server 16 ensures that the advert data for each of the users who requested recordal of the content, is also stored in the appropriate video server 15, so that at the time of playout the selected adverts are available.

In this embodiment, after the user has watched the recorded programme, the PVR server 16 can amend the contents schedule for the recorded programme for that user, for example, to change the adverts that will be played, to remove the adverts altogether or to remove any restrictions on the playout control that the user has.

Management and Billing Server

In this embodiment, all of the interactive television services that are provided to the users are provided at a cost. For example, each time a user wishes to record a programme or watch a programme that has already been broadcast, a charge for recording that programme is made and added to the user's bill. In this embodiment, the management and billing server 29 is operable to collate the bills from all the different application servers 30 and to provide a central user billing and user profiling function. The management and billing server 29 is also responsible for initially logging a user onto the system 1 and for setting up the various user profiles and user tables within the applications database 39 for the new user. During this initial logon procedure, the user will provide the management and billing server 29 with details such as the user's age, password, E-mail addresses, spending limits, user name, world wide web home page, search page, user language, country etc. The management and billing server 29 is then responsible for creating the necessary user tables within the applications database 39 which in turn triggers the updating of the user data within the various caches within the system 1, in order to accommodate the new user.

The management and billing server 29 is also responsible for tracking payment of bills by the different users and for blocking the provision of services or content to users if they do not make payment.

In this embodiment, users can access the data maintained by the management and billing server 29 for example, to identify what the outstanding amount owed by that user is or to identify the different films or programmes that have been purchased or recorded by that user in the current billing period.

In order to carry out the billing, the management and billing server 29 reads a user billing table (not shown) from the applications database 39, where all the application servers 30 write their transactions identifying what services and content have been delivered to each user. The management and billing server 29 then calculates the appropriate amount for those services or content and adds it to the user's bill.

In this embodiment, the management and billing server 29 also monitors the different user requests that are received by the user interface servers 31 which are stored within a user request log (not shown). The management and billing server 29 then uses this information in order to determine user profiles for the different users of the system 1. For example, the management and billing server 29 can perform various statistical processings on the requests made by each user in order to try to identify the types of television programmes or films that the user likes. This user profile information is then stored in the applications database 39 and used, for example, by the PVR server 16. In particular, in this embodiment the PVR server 16 uses this user profile information to make suggestions to the user as to the programmes he might wish to record. The PVR server 16 also uses user favourites data stored in the applications database 39 by the EPG server 21 (which identifies programmes that the user has marked as being favourites in their EPG listing) to control the recording of programmes in the user's personal video recorder as suggestions that the user may want to watch.

SUMMARY AND ADVANTAGES

An interactive television system has been described above in which personal video recorder services are provided for each user with server-side control of capture and playout and with client-side storage of captured content. A number of advantages are achieved by the way in which the system described above is arranged. Some of these advantages will now be described in more detail.

One advantage of the above embodiment is that the content is captured and tagged in the server side of the system and can then be stored locally within the user's set top box. The set top box does not, therefore, require a separate decoder and tagging unit to capture the content and tag it for playout control. Further, since the content can be trickle fed down to the user's set top box prior to playout, the demand on server-side bandwidth at the time of playout can be reduced.

Another advantage of performing the recording at the video server 15 is that the video server 15 can insert personalised adverts into the content based on the profile for the user who requested the content. This advert may be a passive advert or it may be the home page of an interactive advert that allows the user to select it and then spend time browsing within subpages of the advert. These pages may be stored together with the advert or they may be kept as a link to an appropriate web site on the web server 25.

Another advantage of performing the recording at the video server 15 is that it is easier and more cost effective to process the recorded video in order to extract the above described temporal tag data which is used to allow accessing of the recorded video file at any location therein (i.e. in a random access fashion) and other motion control effects such as fast-forward or rewind playout.

Another advantage of the server-side PVR system described above is that since the recording of programmes is carried out in the video server 15, it is possible (using a set top box 7 with a single decoder) for the user to record one or more programmes that are being broadcast whilst watching another programme.

In the above embodiment, multiple users may be associated with the same set top box 7. However, since each user must log on to the system entering their user name and password, the PVR system can keep separate PVR lists for the individual users that share the same set top box 7. Further, separate user profiles are provided for each user of the same set top box and is considered as a separate user of the system by all of the application servers, including the PVR server described above.

Another advantage of the above embodiment is that because control over when recording is to be started and stopped is carried out by the scheduler 40 using the centrally maintained EPG, any last minute updates to the EPG can be taken into account. For example, if a user wishes to record a programme starting at 1700 hours and ending at 1730 hours but the previous programme overruns by 10 minutes, then since the scheduler 40 uses the centrally stored EPG data which is almost always kept up-to-date, the scheduler 40 can ensure that only the desired programme is recorded. In a conventional set top box personal video recorder system, the electronic programme guide which is used to control the recording of the programme is typically downloaded some time in advance of the event playing out on the system. Therefore, either a considerable amount of extra time must be recorded either side of the allocated time slot (which requires more storage space) or some of the programme may be missed.

Another advantage of the above embodiment is that the user profiles determined and managed by the management and billing server 29 are used to suggest programmes for recording for each user. Further, in the above embodiment, each user can indicate which programmes from the EPG listing are their favourites and the PVR server 16 can use this favourites information to control suggestions that are made to each user. Further, different levels of suggestion can be provided to cater for predictions of "hot favourites" which the system predicts that the user will definitely want to watch and, for example, "interesting favourites" which the system thinks that the user may like to watch. Further, since the profiling engine is provided in a single location on the server side of the system rather than in multiple locations in the individual set top boxes 7, a more sophisticated and expensive profiling system may be used which can avoid some of the problems associated with existing personal video recorder systems. For example, many set top box systems will record all broadcasts of a television show even if they are repeats. However, by using a suitably programmed profile engine, this can be detected to ensure that repeats are not recorded.

Further, since the profiling engine is provided centrally, it can use user-identified favourites to control the recording of programmes and prioritise the recordings for the user. Further, since the user profile information used by the PVR server 16 includes user details such as the type of programme the user likes to watch (e.g. science fiction, drama etc.), the PVR server 16 can perform an analysis of the viewing habits of different users to identify programmes that appeal to users who like, for example, science fiction. This information can then be used to respond to queries such as: "I like science fiction, what does everyone else who likes science fiction watch?".

Another advantage of this server-controlled PVR architecture is that the server side of the system can convert non-supported content in the video server 15 prior to downloading to the user's set top box 7. This conversion can take the form of changes in bit rate, changes in video codec, changes in audio codec, changes in encryption technique, addition of supplementary data (such as language-specific subtitles) etc.

An important aspect commercially of providing personal video recording services is to ensure that the system can provide some level of parental control so that, for example, minors under the age of eighteen are not able to access adult material. In the above embodiment, this is achieved automatically through the filtering on a user-by-user basis of the full electronic programme guide (EPG) listing before it is presented to the user. In particular, since each user must log into the system before they can gain access to any of the content provided by the application servers 30 or to any content stored locally within their set top box, and since each user has an associated user profile (which defines, among other things, the user's age) stored centrally within the applications database 39, the EPG server 21 uses this information to filter out content which is not suitable for the user requesting the information. Therefore, for example, minors under the age of eighteen using the system do not receive details of any adult programmes in their downloaded EPG listings. Details of these programmes are automatically filtered out from the full EPG listing on a user-by-user basis by the EPG server 21. Consequently, users can only request content that they are entitled to watch to be recorded within their personal video recorder.

Additionally, even though an adult and a minor may both be users of the system and may both use the same set top box 7, since the PVR server 16 maintains a separate PVR menu page for each user, it is possible to ensure that one user of the set top box 7 cannot see and view the content recorded for another user of the same set top box 7. However, each user can classify the programmes or films that they record into different classes of recordings so that some of the content that they record can be viewed by other users of the same set top box 7. In this embodiment, these classes include:

i) shared storage but individual delete—programmes or videos in this class may be recorded by one user of a set top box 7 but may be viewed by any user of the same set top box, however only the user who recorded the programme or video can delete it;

ii) private storage programmes or videos recorded in this class can only be viewed by the user who recorded them;

iii) private storage but notify other users—programmes or videos stored in this class are not viewable by other users of the same set top box 7 unless another user of the same set top box 7 requests to record the same programme or video, in which case the programme or video is made available to that other user; and iv) shared storage—programmes or videos recorded in this class can be viewed by any user of the same set top box 7 and can be deleted by any user of the set top box 7.

Modifications and Alternatives

A detailed description has been given above of a system for allowing users to gain access to television services and media content from a number of remote servers using a graphical user interface displayed on the user's television. As those skilled in the art will appreciate, various alternatives may be made to the system described above. Some of these modifications and alternatives will now be described.

In the above embodiment, when users request a programme from their personal video recorder, a contents schedule is downloaded from the PVR server together with a URL address which redirects the user's set top box to the call manager which then redirects the user to the appropriate storage location. As those skilled in the art will appreciate, it is not essential to use such a call manager. In particular, the storage location information may be stored within the applications database, in which case the PVR server can direct the user to the appropriate location. However, the use of a call manager within the data network is preferred since it provides a number of advantages. In particular, the call manager can keep a log of what content each user wishes to watch from their personal video recorder. This information can then be used to control the deletion of content from each user's personal video recorder based on its utilisation. The use of the call manager is also advantageous in a distributed system where a number of video servers are provided each storing different content. In this case, the call manager can redirect the user to the appropriate video server or to the nearest video server if two video servers have the requested content. Additionally, the use of such a call manager also removes the need to include specific location details in the applications database. As a further alternative, after the user has retrieved their personal video recorder list and has selected a programme for recording, the user's set top box may be programmed to initially check the local hard disc for the content, and only if it is not stored in the local hard disc to request retrieval of the content either from the PVR server or from the nearest video server.

In the above embodiment, a hard disc was provided in each user's set top box and this was primarily provided for personal video recorder services. Additionally, the hard disc may be used in order to pause the current television programme that the user is watching. In effect, if the user presses the pause button during a live television programme, the user's set top box can start storing the broadcast television programme in the hard disc for subsequent playout by the user. In practice, a limit must normally be placed on the amount of data that can be recorded in the user's hard disc in this way. For example, ten percent of the disc space may be allocated for pausing live television. Depending on the size of the hard disc, this may equate to approximately 30 minutes of recording time.

In the above embodiment, a video server at the head end of the system captured all of the programmes to be recorded and these were then distributed either to other video servers or to user set top boxes. In an alternative embodiment, the burden of capturing the content may be distributed over the geographically distributed video servers, with a central controller controlling which video servers capture which content.

In the above embodiment, parental control was automatically provided in the PVR system by automatically filtering the electronic programme guide data based on the user's age. Other techniques can be used, however, to provide similar parental control. For example, instead of filtering EPG data, the user profile (identifying the channels that the user has subscribed to and the user's age) can be used simply to mark the programmes that the user can record and those that the user cannot record. If the user then tries to record a programme that they are not entitled to, an appropriate error page can be downloaded to the user's set top box from the PVR server.

In the above embodiment, the application servers downloaded XML data files to the user interface servers where they were then transformed into appropriate HTML menu pages for downloading to the user set top box. Alternatively, the application servers and/or the user interface servers may download the XML data files directly to the set top box which could then use an appropriate page assembler and user specific data to create the corresponding HTML menu page. Further, as those skilled in the art will appreciate, it is not essential to use HTML or XML files. However, these are preferred because of their current widespread use throughout the Internet.

In the above embodiment, the set top box was connected to the application servers via a user interface server. However, the set top boxes still received content transmitted directly from some of the application servers bypassing the user interface server. This can cause problems if the user interface servers temporarily go off-line. In this case, the set top box will not be able to access the menu system to control the accessing of the services and content provided by the application servers. However, the last logged-in user's profile and menu page are preferably cached within the user's set top box in order to enable the system to continue playout and capture of incoming live broadcast streams. In this way, the user can still have access to some television services even though connection to the user interface server is temporarily unavailable.

In the above embodiment, the user gained access to the services provided by a plurality of remote servers via a user interface server. This is not essential. For example, the user may gain access to the services or content provided by one or more of the application servers directly, rather than going via the user interface server.

In the above embodiment, the user gained access to the television services and media content using a user set top box and a television. As those skilled in the art will appreciate, it is not essential to use such a set top box and television. For example, the user may gain access to the television services and media content using a personal computer (PC), a handheld device such as a personal digital assistant (PDA) or mobile telephone or any other such user device.

In the above embodiment, the user interface servers were separate from the application servers. As those skilled in the art will appreciate, one or more of the applications may be run on the same physical machine as the machine running the user interface server. For example, the mail server may be run on the same physical machine as one of the user interface servers. In this case, the user interface server may communicate with the mail server using appropriate memory pointers and call-up routines. Additionally, two or more of the applications may be physically run on a single computer device.

In the above embodiment, the user device is connected to the user interface servers through an IP data network. As those skilled in the art will appreciate, the user device may connect to the user interface server by any appropriate means. For example, the connection may be made via a mobile telephone communication link. Alternatively, the user may connect using a telephone and modem such as an ADSL (asymmetric digital subscriber line) link. Alternatively, the set top box may be connected to the user interface server via a cable or a freespace microwave or optical communication link.

In the above embodiment, a single applications database was provided which stored details of all of the users subscribed to the system and which was accessed by the different application servers and user interface servers. As those skilled in the art will appreciate, multiple applications databases may be provided each storing the same information. This allows database queries from the servers to be shared amongst the different databases. As those skilled in the art will appreciate, such an embodiment would require the applications databases to be synchronised with each other so that the data stored in each applications database is the same. Various techniques are known to synchronise multiple databases in this way.

In the above embodiment, the management and billing server was responsible for monitoring the user requests that were made by all of the users from the data stored within a user request log. It then used this information to adapt user profiles stored within the database. As those skilled in the art will appreciate, this task may be performed by a separate global operations controller (not shown) or it may be carried out individually by one or more of the application servers. For example, each of the application servers may be arranged to monitor the statistics relevant to the services offered by that application server. Each application server can then build and use a profile for each user that is relevant to that application server.

As those skilled in the art will appreciate, the client devices, the user interface servers and the application servers may be provided as hardware units or as a mixture of hardware and software components. The software used to control the servers to carry out the functions described above may be written in various computer languages such as C, C++, Java or Perl. The code may be stored in compiled format, in uncompiled format or in any format intermediate the two.

The software may be provided on a storage medium such as a CD-ROM. The software may be downloaded over a data network such as the Internet.

An interactive television system has been described above which provides personal video recorder services to users. As those skilled in the art will appreciate, the techniques and systems described above may be used to capture and to provide subsequent playout of other types of content such as radio or the like.

In the above embodiment, various caches were provided in order to try to reduce the processing burden on either the application server or on the applications database. As those skilled in the art will appreciate, the caching performed in the above embodiment is not essential. One or more of the caches that are used may be omitted. Additionally, a menu cache may be provided locally within each user device (e.g. set top box) to store menu pages previously downloaded from the user interface server. In this case, the user device can check its local cache before transmitting a request for a next menu page. In this way, the number of requests transmitted to the user interface servers can also be minimised.

The invention claimed is:

1. A content delivery system comprising:
   a user device disposed at a client side of the content delivery system, and
   a capture system located remote from said user device, at a server side of the content delivery system, and operable to capture and process content data as the content data is broadcast from a content broadcaster;
   wherein:
   the user device includes:
      i) a first receiver operable to receive user input;
      ii) a transmitter operable to transmit, in response to a first user input identifying content to be recorded, a request to said remote capture system to capture the content identified by said first user input;
      iii) a second receiver operable to receive the content data captured, remotely, in response to the request;
      iv) a storage device for storing the captured and processed content data received by said second receiver; and
      v) a playout unit operable to retrieve the content from said storage device and operable to playout the retrieved content;
   the content data remotely captured is also processed by said remote capture system;
   the capture system is operable to maintain a record of all content transmitted to said user device for storage in said storage device;
   said capture system is operable to download data defining a graphical user interface based on the record of the content stored in the storage device of the user device;
   said graphical user interface identifies content that has been captured by said capture system in response to a request received by said user device and content that has been captured automatically by said capture system based on a user profile for the user associated with the user device;
   the graphical user interface is operable to communicate inputs from the user to the server side of the content delivery system, whereby a request from the user to retrieve and playout content stored in the storage device of the user device is provided to the server side of the content delivery system; and
   the playout of the content stored in the storage device is enabled under control of the server side of the content delivery system.

2. A system according to claim 1, wherein said capture system is operable to process said captured content data to determine tag data identifying the timing of content segments within the captured content.

3. A system according to claim 2, wherein said capture system is operable to transmit said captured content data together with said tag data to said second receiver of said user device and wherein said storage device is operable to store both the captured content data and the generated tag data.

4. A system according to claim 3, wherein said playout unit is operable to control the playout of said stored content data in dependence upon on the tag data associated with the content data.

5. A system according to claim 4, wherein said playout unit is operable to control the playout of said content data in accordance with said tag data and a user input identifying the rate at which the content data is to be played out.

6. A system according to claim 5, wherein said playout unit is operable to control the rate at which said content data is played out to provide fast forward and/or rewind capabilities.

7. A system according to claim 1, wherein said content data represents a video broadcast.

8. A system according to claim 7, wherein said capture system includes a video server operable to capture video data as it is broadcast by said content broadcaster.

9. A system according to claim 7, further comprising a personal video recorder (PVR) server operable to receive the requests transmitted by said user device and operable to control the capturing of said video data by said video server.

10. A system according to claim 9, wherein said capture system includes a database, wherein said PVR server is operable to store received user requests for content recordal in said database and further comprising a scheduler operable to process the requests stored in said database together with programme guide data identifying the timing at which content is to be broadcast by said content broadcaster, to control the capturing of content by said video server.

11. A system according to claim 10, wherein said scheduler is operable to provide channel data identifying the channels to be recorded together with data identifying the start and end time for the recordings.

12. A system according to claim 1, wherein said capture system is operable to generate a contents schedule for each piece of content captured by the capture system, which contents schedule identifies a sequence of content portions of captured content to be played out by the playout unit of said user device.

13. A system according to claim 12, wherein said contents schedule identifies a sequence of programme segments and adverts to be played out by said playout unit.

14. A system according to claim 12, wherein said capture system is operable to generate a personalised contents schedule for the user device based on a user profile associated with a user of the user device.

15. A system according to claim 14, wherein said capture system is operable to personalise said contents schedule by selecting advert data defining personalised adverts to be played out by said playout unit.

16. A system according to claim 12, wherein said capture system is operable to generate a plurality of different contents schedules one for each of a corresponding plurality of different user types, wherein the user associated with the user device is categorised as belonging to one of said user types and wherein said capture system is operable to transmit to said user device the contents schedule for the type of user associated with the user device.

17. A system according to claim 12, wherein said capture system is operable to mark one or more of said sequence of content portions to restrict playout control available to a user of said user device.

18. A system according to claim 1, wherein said capture system is operable to transmit guide data identifying different content that will be broadcast by said contents broadcaster and wherein said user device is operable to output said guide data to said user.

19. A system according to claim 1, wherein said capture system is operable to generate a menu page identifying the content that can be recorded by said capture system and wherein said user device is operable to display said menu page to said user.

20. A system according to claim 1, wherein:
said capture system is operable to capture and buffer all content broadcast by said content broadcaster during a previous N hours;
said user device includes a third receiver for receiving live content broadcast from said content broadcaster; and
said capture system is operable to use the content captured during said previous N hours to provide pause live content functionality to said user device.

21. A system according to claim 1, wherein said capture system includes a transmitter for transmitting the captured and processed content data to said user device at a data rate which is less than a data rate required for real time playout of the content by said playout unit.

22. A system according to claim 1, further comprising a second storage device provided remote from said user device and operable to store content captured by said capture system for a user associated with the user device, wherein:
said user device is operable to transmit a recorded content playout request to said capture system, and
said capture system is operable to redirect the user to the storage device containing the requested content.

23. A system according to claim 1, wherein said capture system is operable to make suggestions of content to be recorded to said user device and is operable to record suggestions selected by a user associated with the user device.

24. A system according to claim 23, wherein said capture system is operable to make said suggestions based on user profile data for the user associated with the user device.

25. A system according to claim 23, wherein said capture system is operable to make said suggestions based on previous programmes viewed by the user associated with the user device.

26. A system according to claim 1, wherein multiple users are associated with said user device, wherein said capture system includes user profile data for each user associated with the user device, and wherein said user device is operable to transmit current user ID data to said capture system to identify the current user associated with the user device, and wherein the capture system is operable to use said current ID data to select the user profile data for the current user.

27. A system according to claim 26, wherein said capture system maintains a record list for each user associated with the user device and is operable to use the current user ID to select the record list for the current user of the user device.

28. A user device for use in a content delivery system, the user device comprising:
a first receiver operable to receive user input;
a transmitter operable to transmit, in response to a first user input identifying content to be recorded, a request to a remote capture system to capture the content identified by said first user input;
a second receiver operable to receive captured and processed content data from said remote capture system;
a storage device for storing the captured and processed content data received by said second receiver; and
a playout unit operable to playout the contents stored on the storage device only in response to receiving a remote transmission indicating permission to playout the contents;
whereby the user device initiates server side capture of the content, provides client side storage of the captured content, and initiates playout of the captured content under server side control;
wherein said capture system is operable to download data defining a graphical user interface based on the record of the content stored in the storage device of the user device; and
said graphical user interface identifies content that has been captured by said capture system in response to a request received by said user device and content that has been captured automatically by said capture system based on a user profile for the user associated with the user device.

29. A user device according to claim 28, wherein said captured and processed content data includes tag data identifying the timing of content segments within the captured content and wherein said storage device is operable to store both the captured content data and the generated tag data.

30. A user device according to claim 29, wherein said playout unit is operable to control the playout of said stored content data in dependence upon on the tag data associated with the content data.

31. A user device according to claim 28, operable to receive said captured and processed content data at a data rate which is less than a data rate required for real time playout of the content by said playout unit.

32. A user device according to claim 28, operable to transmit a recorded content playout request to said remote capture system and operable to receive a redirect instruction from said capture system to the storage location of the requested content.

33. A capture system for use in a content delivery system, the capture system comprising:
a receiver operable to receive a user request from a remote user device, identifying content to be captured;
a capture device operable to capture and process content data as it is broadcast from a content broadcaster in accordance with said user request;
a transmitter operable to transmit captured and processed content data to said remote user device for storage therein;
wherein, in response to a request from the remote user device for playout of the transmitted content data, the capture system is operable to make a determination as to whether the playout request should be granted, and responds to the request based on the result of the determination;
wherein said capture system is operable to download data defining a graphical user interface based on the record of the content stored in the storage device of the user device; and
said graphical user interface identifies content that has been captured by said capture system in response to a request received by said user device and content that has been captured automatically by said capture system based on a user profile for the user associated with the user device.

34. A system according to claim 33, operable to process said captured content data to determine tag data identifying the timing of content segments within the captured content.

35. A system according to claim 34, operable to transmit said captured content data together with said tag data to said user device for storage in said user device.

36. A system according to claim 33, wherein said capture device is operable to capture a video broadcast and wherein said capture device includes a video server operable to capture video data as it is broadcast by said content broadcaster.

37. A system according to claim 33, wherein said capture device includes a database, wherein said receiver is operable to store received user requests for content recordal in said database and further comprising a scheduler operable to process the requests stored in said database together with programme guide data identifying the timing at which content is to be broadcast by said content broadcaster, to control the capturing of content by said capture device.

38. A system according to claim 37, wherein said scheduler is operable to provide, to said capture device, channel data identifying the channels to be recorded together with data identifying the start and end time for the recordings.

39. A system according to claim 33, operable to generate a contents schedule for each piece of content captured by the capture device, which contents schedule identifies a sequence of content portions of captured content to be played out by the user device.

40. A system according to claim 33, wherein said transmitter is operable to transmit the captured and processed content data to said user device at a data rate which is less than a data rate required for real time playout of the content by said user device.

41. A content delivery method comprising:
  transmitting from a user device in response to a user input, a request to a remote capture system to capture content identified by the user input;
  receiving the user request at the remote capture system and capturing and processing the identified content when it is broadcast from a content broadcaster;
  transmitting the captured and processed content data to said user device;
  storing the content data received by said user device in a storage device of the user device; and
  retrieving, in response to a user input, provided from the user device to the remote capture system, and identifying stored content to be played out, the content identified by said user input from said storage device and playing out under control of the remote capture system the retrieved content to an associated user;
  wherein said capture system is operable to download data defining a graphical user interface based on the record of the content stored in the storage device of the user device; and
  said graphical user interface identifies content that has been captured by said capture system in response to a request received by said user device and content that has been captured automatically by said capture system based on a user profile for the user associated with the user device.

42. A computer readable storage medium storing computer executable instructions for causing a programmable computer device to become configured as the user device of claim 28.

43. A computer readable storage medium storing computer executable instructions for causing a programmable computer device to become configured as the capture system according to claim 33.

* * * * *

UNITED STATES PATENT AND TRADEMARK OFFICE
CERTIFICATE OF CORRECTION

PATENT NO. : 7,624,412 B2 Page 1 of 1
APPLICATION NO. : 10/516470
DATED : November 24, 2009
INVENTOR(S) : McEvilly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Fourteenth Day of December, 2010

David J. Kappos
*Director of the United States Patent and Trademark Office*